(12) United States Patent
Fertig et al.

(10) Patent No.: US 9,507,909 B2
(45) Date of Patent: Nov. 29, 2016

(54) SYSTEM AND METHOD FOR COMPUTATIONAL PLANNING IN A DATA-DEPENDENT CONSTRAINT MANAGEMENT SYSTEM

(71) Applicant: The Boeing Company, Seal Beach, CA (US)

(72) Inventors: Kenneth W. Fertig, Palo Alto, CA (US); Sudhakar Y. Reddy, Santa Clara, CA (US); Philip L. Stubblefield, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1061 days.

(21) Appl. No.: 13/651,170

(22) Filed: Oct. 12, 2012

(65) Prior Publication Data
US 2014/0107987 A1 Apr. 17, 2014

(51) Int. Cl.
*G06F 7/60* (2006.01)
*G06F 17/10* (2006.01)
*G06F 17/50* (2006.01)

(52) U.S. Cl.
CPC ....... *G06F 17/5095* (2013.01); *G06F 17/5086* (2013.01); *G06F 2217/06* (2013.01)

(58) Field of Classification Search
CPC .......... G06F 17/5095; G06F 17/5086; G06F 2217/06
USPC .................................. 703/2, 8, 6
See application file for complete search history.

(56) References Cited

U.S. PATENT DOCUMENTS

2007/0239497 A1  10/2007  Fertig

OTHER PUBLICATIONS

Reddy, Sudhakar Y. et al., "Constraint Management Methodology for Conceptual Design Tradeoff Studies", Aug. 18-22, 1996, Proceedings of the 1996 ASME Design Engineering Technical Conferences and Computers in Engineering Conference, ASME.*
Weld, Daniel S., "Recent Advances in AI Planning", 1999, AI Magazine vol. 20, No. 2, American Association for Artificial Intelligence.*
Sriram, R.D., "Intelligent Systems for Engineering—Chapter 4: Knowledge-Centered Problem Solving Strategies", 1997, Springer-Verlag.*
Reddy, Sundhakar Y. et al., "Constrained Exploration of Trade Spaces", 2006, 2nd IEEE International Conference on Space Mission Challenges for Information Technology, IEEE.*
Tapankov, Martin, "Managing Dependencies in Knowledge-Based Systems: A Graph-Based Approach", 2009, Thesis Work, Tekniska Hogskolan.*
Reddy, Sunhakar Y. et al., "Design Sheet: A System for Exploring Design Space", 1996, Artificial Intelligence in Design, Kluwer Academic Publishers.*
Buckley, M.J. et al., "Design Sheet: An Environment for Facilitating Flexible Trade Studies during Conceptual Design", 1992, American Institute of Aeronautics and Astronautics, Inc.*

(Continued)

*Primary Examiner* — Cedric D Johnson

(57) ABSTRACT

A method of determining a conditional computational plan for a data dependent constraint network represented by a bipartite graph containing input variable nodes, output variable nodes, and relation nodes, may include specifying, using a variable node specifier, at least one output variable node for which a plan is desired. The method may further include determining, using a plan determiner, a plan from the input variable nodes to the output variable node using a backward chaining search of the bipartite graph.

26 Claims, 35 Drawing Sheets

(56) References Cited

OTHER PUBLICATIONS

Thiebaux, Sylvie, "Anytime Reaction Planning in Probabilistic Logic", Jun. 1992, Department of Computer Science, Florida Institute of Technology.*

Kim, Eun Gi, "A Constraint Management Model for Decision Support Systems", Dec. 1993, Department of Applied Computer Science, Illinois State University.*

Reddy et al., "Constrained Exploration of Trade Spaces", 2006.

U.S. Appl. No. 13/422,335, "System and Method for Rapid Management of Logic Formulas," filed Mar. 16, 2012.

Sudhakar Y. Reddy, Kenneth W. Fertig and David E. Smith: "Constraint Management Methodology for Conceptual Design Tradeoff Studies", Proceedings of the 1996 ASME Design Engineering Technical Conferences and Computers in Engineering Conference, Aug. 22, 1996, Available at URL: http://teledyne-sc.com/designsheet/dtm-96.pdf.

Serrano, David: "Automatic dimensioning in design for manufacturing", ACM, 2 Penn Plaza, Suite 701—New York USA, Dec. 31, 1991.

Reddy, S. Y. et al: "Design Sheet: a system 1-15 for exploring design space", Proceedings of the International Conference on Artificial Intelligence in Design, XX. XX. Jan. 1, 1996, pp. 347-366.

S.J. Carden: "A mathematical framework for a general purpose constraint management system", Jan. 1, 1998.

Page, M. et al: "An algorithm for 1-15 goal-driven simulation", Winter Simulation Conference Proceedings, 1999 Phoenix, AZ, USA, Dec. 5-8, 1999, Piscataway, NJ, USA,IEEE, US, vol. 15 Dec. 1999 (Dec. 5, 1999), pp. 578-585, ISBN: 978-0-7803-5780-8.

* cited by examiner

| World Set: WFF (Well-Formed Formula defining a set of worlds) | Worlds | Venn Diagram |
|---|---|---|
| True | All Worlds | S=s1, S=s2, S=s3; Q and Not(Q) all shaded |
| Q | {Q and S=s1, Q And s=s2, Q And S=s3} | Q row shaded across S=s1, S=s2, S=s3 |
| Not(Q) | {Not(Q) and S=s1, Not(Q) And s=s2, Not(Q) And S=s3} | Not(Q) row shaded across S=s1, S=s2, S=s3 |
| S=s1 | {Q And S=s1, Not(Q) and S=s2} | Q and Not(Q) shaded at S=s1 |
| Q And S=s1 | {Q And S=s1} | Q shaded at S=s1 |
| Q And (S=s1 Or S=s3) | {Q And S=s1, Q And S=s3} | Q shaded at S=s1 and S=s3 |
| False | No Worlds | nothing shaded |

Labels: 140 → World Set column; 138 → Worlds column; 142 → WFF row; 134, 124 → Q row; 136, 124 → S=s1 row.

FIG. 7

Method: FindPlan ( graph, inputs, outputs, worldSet)
1. Plan<- Initialize plan structure to the empty plan
2. If the argument inputs is not empty, then set specifiedInputs? = True. Otherwise, set specifiedInputs? = False
3. For each input in inputs
   3.1. vnode <- input
   3.2. AddPlanInput(vnode, False, False, plan)
   3.3. Select next input. If done, go to 4, else go to 3.1
4. For each output in outputs
   4.1. vnode <- output
   4.2. vnodeWs <- VnodeDeterminedWorldSet (worldSet, vnode)
   4.3. If vnodeWs = False, then Go to 4.3.1, Else Go To 4.4
      4.3.1. Result <- FAIL
      4.3.2. Go to 5
   4.4. AddPlanOutput (vnode, vnodeWs, plan)
   4.5. planFound <- FindPlanForVnode ( vnode, specifiedInputs?, vnodeWs, plan)
   4.6. If planFound =False, then AddPlanStub (vnode, vnodeWs, plan)
   4.7. Select next output. If done, go to 5, else go to 4.1
5. Result <- FinalizePlan (plan)
6. Return Result

FIG. 9B

Method: VnodeDeterminedWorldSet (worldSet, vnode)

1. newMap <- RepartitionMap(StatusMap(vnode), worldSet)
2. determinedWorldSet <- Union {ws[j] | ws[j] -> status[j] is an element of newMap and status[j] = 'determined'}
3. Return determinedWorldSet

Method: AddPlanOutput (vnode, worldSet, plan)
1. If <vnode, ws> is in the outputQueue(plan) then go to 2, else go to 4
2. ws <- Union(ws, worldSet) and replace this in outputQueue(plan)
3. got to 5
4. add <vnode, worldSet> to outputQueue(plan)
5. return

Method: AddPlanInput (vnode, specifiedInputs?, worldSet, plan)
1. If <ws, vnode> is in inputQueue(plan) then go to 1.1, else go to 1.3
   1.1. vnode has already been added to the input queue. Replace <ws, vnode> with <Union(ws, worldSet), vnode>
   1.2. result <- True, go to 1.7
   1.3. If specifiedInputs?= True, then go to 1.6
   1.4. Any independent vnode is allowed as an input.
        Push <worldSet, vnode> onto inputQueue(plan)
   1.5. result <- True, go to 1.7
   1.6. result <- False
   1.7. Return result

FIG. 12B

Method: FindPlanForVnode (vnode, specifiedInputs?, worldSet, plan)
1. Initialize data
   1.1. stubWorlds <- empty
   1.2. successCode <- False
   1.3. vnodeWs <- worldSet
2. for each <inflowVs, inflow> in InflowMap(vnode)
   2.1. If inflow = :Independent, then got to 2.1.1, else go to 2.2
      2.1.1. If AddPlanInput(vnode, inflowWs, plan) is True then got to 2.1.2, else got to 2.1.4
      2.1.2. successCode <- True
      2.1.3. Go to 2.3
      2.1.4. stubWorlds <- Push (inflowWs onto stubWorlds)
      2.1.5. Go to 2.3
   2.2. For each <graphWs, arcGraph> in RepartitionMap(ArcGraphs(inflow), inflowWs)
      2.2.1. If arcGraph = top level constraint graph, go to 2.2.4, else go to 2.2.2
      2.2.2. Test <- FindPlanForComponent(arcGraph, specifiedInputs?, graphWs, plan)
      2.2.3. Go to 2.2.5
      2.2.4. Test <- FindPlanForRnode(ArcRnode(inflow), specifiedInputs?, graphWs, plan)
      2.2.5. If test = True go to 2.2.6, else go to 2.2.8
      2.2.6. successCode <- True
      2.2.7. Go to 2.2.9
      2.2.8. stubWorlds <- Push(graphWs onto stubWorlds)
      2.2.9. Select next <graphWs, arcGraph>. If done go to 2.3, else go to 2.2.1.
   2.3. Select next <inflows, inflow>. If done go to 3, else go to 2.1
3. If success = True And Not(stubWorlds = empty), go to 3.1, else go to 4
   3.1. allStubWorlds <- Union(ws in stubWorlds)
   3.2. AddPlanStub(vnode, allStubWorlds, plan)
4. Return successCode

FIG. 13B

Method: FindPlanForComponent (component, specifiedInputs?, worldSet, plan)
1. Initialize variables
   1.1. vnodes <- ComponentVnodes(component)
   1.2. ws <- Intersect( worldSet, EnablingWorldSet(component))
2. For each vnode in WorldSetStateVariables(worldSet)
   2.1. If vnode in vnodes, then go to 2.1.1, else go to 2.2
      2.1.1. ws <- RemoveStateDependence(vnode, ws)
      2.1.2. go to 2.2
   2.2. Select next vnode. If done go to 3, else go to 2.1
3. result <- FindPlanForArcs(component, specifiedInputs?,
                ComponentPredecessorArcs(component), ws, plan)
4. Return result

FIG. 14B

Method: FindPlanForRnode (rnode, specifiedInputs?, worldSet, plan)
1. Initialize data
   1.1. outflowArc <- WorldSetValue( outflowArcs(rnode), worldSet)
   1.2. allRnodeArcs <- RnodeArcs(rnode)
2. result <- FindPlanForArcs(outflowArc, specifiedInputs?, allRnodeArcs, worldSet, plan)
3. Return result

FIG. 15B

Method: FindPlanForArcs (stepObject, specifiedInputs?, arcs, worldSet, plan)
1. Initialize data
    1.1. visitedWs <- StepWorldSetInPlan( stepObject, arcs, worldSet, plan)
    1.2. unvisitedWs <- Difference(worldSet, visitedWs)
2. If unvisitedWs = False, then go to 2.1, else go to 2.3
    2.1. successCode <- True
    2.2. Go to 7
    2.3. WorldSet <- unvisitedWs
    2.4. Go to 3
3. Initialize more data
    3.1. successCode <- False
    3.2. inflowp <- False
    3.3. stepWorlds <- nil
    3.4. stubMap <- nil
    3.5. predecessors <- nil
4. For each arc in arcs
    4.1. For each <arcWs, direction> in RepartitionMap(ArcDirectionMap(arc), worldSet)
        4.1.1. If direction = 'rnode', go to 4.1.1.1, else go to 4.1.2
            4.1.1.1. vnode <- ArcVnode(arc)
            4.1.1.2. inflowp <- True
            4.1.1.3. test <- FindPlanForVnode(vnode, specifiedInputs?, arcWs, plan)
            4.1.1.4. If test = True, go to 4.1.1.4.1, else go to 4.1.1.4.5
                4.1.1.4.1. successCode <- True
                4.1.1.4.2. stubWorlds <- Push (arcWs onto stubWorlds)
                4.1.1.4.3. predecessors <- Push( <arcWs, vnode> onto predecessors)
                4.1.1.4.4. go to 4.1.2
                4.1.1.4.5. stubMap <- Push (<arcWs, vnode> onto stubMap)
                4.1.1.4.6. go to 4.1.2
        4.1.2. Select next <arcWs, direction>. If done go to 4.2, else go to 4.1.1
    4.2. Select next arc. If done, go to 5., else go to 4.1
5. If inflowp, go to 6, else go to 5.1
    5.1. If specifiedInputs? Is True, go to 6, else go to 5.2
    5.2. successCode <- True  ;; relation has no inflow, do not check for inputs here.
    5.3. stepWorlds <- Push (worldSet onto stepWorlds)
    5.4. go to 6
6. If successCode = True, go to 6.1.1, else go to 7
        6.1.1. For each <ws, vnode> in stubMap, do AddPlanStub (vnode, ws, plan).
        6.1.2. successWs <- Union (world in stepWorlds)
        6.1.3. successStateVnodes <- WorldSetStateVariables( successWs)
        6.1.4. predecessorVnodes <- vnode | <ws, vnode> is in predecessors
        6.1.5. stateVnodes <- Difference(successStateVnodes, predecessorVnodes)

FIG. 16C

6.1.6. for each vnode in stateVnodes
   6.1.6.1. relaxedWs <- RemoveStateDependence(vnode, successWs)
   6.1.6.2. test <- FindPlanForVnode(vnode, specifiedInputs?, relaxedWs, plan)
   6.1.6.3. If test = True, then go to 6.1.6.3.1, else go to 6.1.6.3.3
      6.1.6.3.1. Predecessors <- Push (relaxedWs, vnode onto predecessors)
      6.1.6.3.2. Go to 6.1.6.4
      6.1.6.3.3. AddPlanStub(vnode, relaxedWs, plan)
      6.1.6.3.4. Go to 6.1.6.4
   6.1.6.4. Next vnode. If done, go to 6.1.7, else go to 6.1.6.1
6.1.7. unvisitedSuccessWs <- Difference(successWs, StepWorldStepInPlan(stepObject, plan))
6.1.8. If unvisitedSuccessWs = False, go to 7, else go to 6.1.8.1
   6.1.8.1. AddPlanStep(stepObject, unvisitedSuccessWs, predecessors, plan)
   6.1.8.2. Go to 7
7. Return successCode

FIG. 16D  — 228

Method: AddPlanStub (vnode, worldSet, plan)
1. Does entry <- Find vnode in stubQueue(plan) exist? If so, go to 2, else go to 4
2. Modify entry's associated world set: entry(world) <- Union(worldSet, entry(world))
3. Go to 5
4. Push new entry <- <vnode, worldSet> onto stubQueue(plan)
5. Return entry.

Method: AddPlanStep (stepObject, worldSet, predecessors, plan)
1. Initialize data
   1.1. stack <- stepStack(plan)  ;; extract the stack structure from the plan
   1.2. stepMap <- nil
2. If stack is empty go to 2.4, else go to 2.1
   First we check to see if the stack is empty or if its first step is in the predecessors list of step object we want to insert. If either of these cases is true, we will insert the step object and its associated step on the front of the stack. We note this means the step objet is ion the stack in front of its predecessors. We will reverse the stack to put it in the proper order at the end of the entire plan search.
   2.1. firstStep <- First(stack)  ;; get the first step from the stack
   2.2. plancomputes <- PlanComputesVnodeP(firstStep, predecessors)
       determine if the variable (or variables in the case of a component) associated with the first step is (are) in the stepObject's predecessor list with an world set that overlaps the first step's world set.
   2.3. If plancomputes is True, go to 2.4, else go to 3
   2.4. stepMap <- {worldSet -> stepObject}
       form the entry for stepObject that will be added to the plan's stack
   2.5. Push stepMap onto stack
   2.6. Go to 4
3. stackRemaining <- stack, begin loop at 3.1
   This loops over the plan stack trying to find the first place to insert the stepObject. It keeps moving down the stack until ether we are at the last step and it is not a predecessor, or it finds a step in the stack which is in the predecessors list of the stepObject we want to insert.
   3.1. If stackRemaining is empty, go to 4
   3.2. stepMap1 <- First(stackRemaining)
   3.3. stepObject1 <- getObject(stepMap1)
   3.4. stepWs1 <- getWorldSet(stepMap)
   3.5. If stepObject1 = stepObject, then go to 3.5.1, else go to 3.6
       3.5.1. Destructively modify stepMap by replacing stepWs1 with Union(worldSet, stepWs1)
       3.5.2. Go to 4 (i.e. return from loop that was starting at 3)
   3.6. If stepMap2 <- Second(stackRemaining) is empty go to 3.6.3, else go to 3.6.1
       3.6.1. Plancomputes2 <- PlanComputesVnodeP(stepMap2, predecessors)
       3.6.2. If plancomputes2 is True, go to 3.6.3, else go to 3.7
       3.6.3. stepMap <- worldSet -> stepObject
       3.6.4. Push stepMap onto front of Rest(stackRemaining)
       3.6.5. Go to 4 (i.e. return from loop starting at 3)
   3.7. stackRemaining <- Rest(stackRemaining)
   3.8. Go to 3.1
4. Return stepMap.

FIG. 18B

Method: StepWorldSetInPlan( stepObject, plan)
1. stepWorlds <- empty/initialize stepworlds to the empty list of worlds
2. Loop for <ws, step> in stepStack(plan)
   2.1. If step = stepObject then stepWorlds <- Push (ws onto stepWorlds). If done, got to 3, else go to 2.1.
   2.2. Get next <ws, step>. If done, got to 3, else go to 2.1.
3. result <- Union(world in stepworlds).
4. Return result.

Method: Finalize(plan)
1. stepStack(plan) <- Reverse(stepStack(plan))
2. Return plan

SYSTEM AND METHOD FOR COMPUTATIONAL PLANNING IN A DATA-DEPENDENT CONSTRAINT MANAGEMENT SYSTEM

CROSS-REFERENCE TO RELATED APPLICATIONS

The present application is related to pending U.S. application Ser. No. 13/422,335 filed on Mar. 16, 2012, and entitled SYSTEM AND METHOD FOR RAPID MANAGEMENT OF LOGIC FORMULAS, the entire contents of which is expressly incorporated by reference herein.

FIELD

The present disclosure relates generally to constraint management systems and, more particularly, to computational planning in a data-dependent constraint network.

BACKGROUND

The conceptual design of a vehicle such as an aircraft or a space launch vehicle typically involves a set of design tradeoff studies or trade studies wherein numerous system configurations and criteria may be considered. In order to arrive at an optimal design, it is desirable to evaluate a wide variety of candidate design concepts from the standpoint of vehicle performance, cost, reliability, and a variety of other factors across multiple disciplines. The evaluation of candidate design concepts may be implemented in a computational procedure such as in a constraint management system or a constraint network.

A constraint network may be represented as a bipartite graph containing variable nodes and relation nodes interconnected by arcs. Each variable node represents a variable in the constraint network. Each relation node represents an equality constraint (e.g., an equation). An arc may connect a variable node to a relation node if and only if the variable is included in the equality constraint of the relation node. The arcs in the bipartite graph may be directed, with one outgoing arc from each equality constraint pointing to the variable that the equality constraint is meant to compute given the values of other variables that are connected to the equality constraint.

In the classical implementation of a constraint network for trade study applications, the set of equations is static such that every equation is satisfied all the time. In addition, alternative computational methods may be embedded in selected equations such as in the following representation for determining the aerodynamic drag of an aircraft:

dragPlane=If(CanardIsPresent, dragBodyC_anardAttached(FuselageSize)+dragCanard(CanardSize), dragBody_NoCanard(FuselageSize))

Unfortunately, embedding computational methods in equations such as in the above-noted representation can be cumbersome for a modeler of complex systems involving many different configurations. Furthermore, embedding computational methods in equations may prevent the performance of certain types of trade studies that require the reversal of the computational flow.

An alternative to embedding computational methods in equations is to make the applicability of any given equation dependent upon the computational state determined by the constraint network. An important property of constraint network modeling is the separation of computational planning from the numerical solution of the constraint sets in the computational path. Computational planning may be defined as determining the ordered sequence of computational steps (i.e., the computational path through the constraint network from a specified input variable to a specified output variable, during the performance of a given trade study. The separation of computational planning from the numerical solution of the constraint sets is essential for providing a system designer with relatively rapid feedback during a trade study. This, in turn, allows the system designer to explore a wide variety of designs during a trade study.

In the case where the applicability of each equation is not static and is instead data-dependent, an effective technique for modeling such data dependence is to attach to each equation a propositional form, or a well-formed formula (WFF), which depends upon the data in the network, and which, if such WFF evaluates to true, means that the equation is applicable in the given situation. In this regard, each WFF has a truth value defining a set of worlds where the WFF is true.

In the computational plan for a data-dependent constraint network, each computational step is associated with a propositional form or a WFF which depends upon the data in the network and upon the results computed in the previous computational steps, and which, if the WFF evaluates to true, means that the computational step is evaluated in the given situation. The WFFs associated with each computational step may be obtained by applying different combinations of union, intersection, and difference operators to the WFFs associated with the equations that need to be solved. When a WFF simplifies to a universally false WFF, the computational plan generation procedure can prune unneeded branches of a constraint network and thereby produce compact and efficient computational plans.

Traditional methods for finding a computational plan in a constraint network rely on a topological sort of the bipartite graph. The computational complexity of such traditional methods may be linear with the size of the graph. However, such traditional methods may not be applicable when the topology of the graph varies dynamically with the values of the variables in the graph as in a data-dependent constraint network. Furthermore, computational planning using traditional methods may involve the intermixing of planning and computation of the constraint sets in the computational path. The intermixing of planning and computation reduces the flexibility and speed with which a designer may explore design spaces which limits the variety of designs that a designer may explore.

As can be seen, there exists a need in the art for a system and method for computational planning in a data-dependent constraint network that avoids the intermixing of planning and computation.

SUMMARY

The above-noted needs associated with conditional planning in a data-dependent constraint network are specifically addressed and alleviated by the present disclosure which provides a method of determining a conditional computational plan for a data dependent constraint network represented by a bipartite graph. The bipartite graph may contain input variable nodes, output variable nodes, and relation nodes. The variable nodes and relation nodes may be interconnected by arcs. The method may include specifying at least one output variable node for which a plan is desired, and determining a plan from the input variable nodes to the output variable nodes using a backward chaining search of the bipartite graph.

In a further embodiment, disclosed is a method of determining a conditional computational plan for a data dependent constraint network represented by a bipartite graph containing input variable nodes, output variable nodes, and relation nodes wherein the variable nodes and the relations nodes may be interconnected by arcs. The method may include specifying output variable nodes for which computational plans are desired, specifying the input variable nodes from which computational steps of the plans are desired for computing values of the output variable nodes, specifying world sets in which the plans are desired, and determining the plans from the input variable nodes to the output variable nodes using a backward chaining search of the bipartite graph.

Also disclosed is a processor-based system for determining a conditional computational plan for a data dependent constraint network represented by a bipartite graph containing input variable nodes, output variable nodes, and relation nodes. The variable nodes and the relation nodes may be interconnected by arcs. The processor-based system may include a variable node selector configured to specify variable nodes as inputs representing a starting point for the plan and variable nodes as outputs to be computed by the plan. The processor-based system may additionally include a plan determiner configured to determine a plan from the input variable nodes to the output variable nodes using a backward chaining search of the bipartite graph.

The features, functions and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

These and other features of the present disclosure will become more apparent upon reference to the drawings wherein like numbers refer to like parts throughout and wherein:

FIG. 7 is a table listing the various world sets involving the boolean state variable Q and the categorical state variable S with values in {s1, s2, s3};

FIG. 9B is a pseudo code listing of a routine for implementing the method of determining the computational plan illustrated in the flow diagram of FIG. 9A;

FIG. 10B is a pseudo code listing of a routine for implementing the method of determining the computational plan illustrated in the flow of FIG. 10A;

FIG. 11B is a pseudo code listing of a routine for implementing the method of updating the output queue as illustrated in the flow diagram of FIG. 11A;

FIG. 12B is a pseudo code listing of a routine for implementing the method of adding variable nodes to the input queue illustrated in the flow diagram of FIG. 12A;

FIG. 13B is a pseudo code listing of a routine for implementing the method of finding a plan for a variable node as illustrated in the flow diagram of FIG. 13A;

FIG. 14B is a pseudo code listing of a routine for implementing the method of determining a plan for a strong component as illustrated in the flow diagram of FIG. 14A;

FIG. 15B is a pseudo code listing of a routine for implementing the method of determining a plan for a relation node as illustrated in the flow diagram of FIG. 15A;

FIGS. 16c-16D represent a pseudo code listing of a routine for implementing the method of determining the plan for an input argument when a plan step comprises either an arc or a strong component as illustrated in the flow diagram of FIG. 16A;

FIG. 17B is a pseudo code listing of a routine for implementing the method of modifying the plan structure by adding a variable and associated world set to the stub queue as illustrated in the flow diagram of FIG. 17A;

FIG. 18B is a pseudo code listing of a routine for implementing the method of modifying the plan structure by adding a computational step and associated world set to the plan queue as illustrated in the flow diagram of FIG. 18A;

FIG. 19B is a pseudo code listing of a routine for implementing the method of determining a union of all of the world sets that are associated with an input step object of the plan as illustrated in the flow diagram of FIG. 19A;

FIG. 20B is a pseudo code listing of a routine for implementing the method of finalizing the plan by reversing an order of plan steps of the plan as illustrated in the flow diagram of FIG. 20A.

DETAILED DESCRIPTION

Figure 1B:
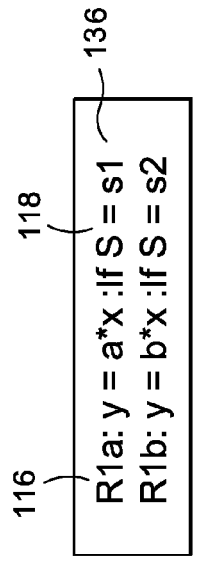
FIG. 1B is a representation of the equality constraint represented by the relation node of FIG. 1A.
Figure 1A:
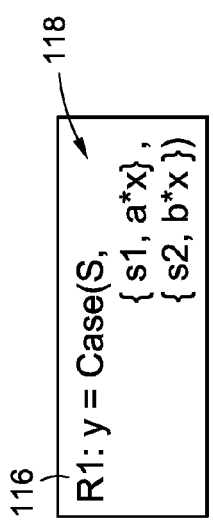
FIG. 1A is a diagrammatic illustration of a data-independent constraint network having one relation node representing an equality constraint interconnected by a plurality of arcs to five variable nodes each representing a variable.

Referring now to the drawings wherein the showings are for purposes of illustrating various embodiments of the present disclosure, shown in FIG. 1A is a diagram of a data-independent constraint network 101 having one relation node 114 and five variable nodes 120 that are each connected to the relation node 114 by an arc 110. The relation node 114 represents an equality constraint, R1, or equation. Each one of the variable nodes, x, a, S, b, and y, represents a variable. FIG. 1B illustrates the equality constraint R1 of FIG. 1A wherein the conditional is embedded within the equality constraint. In data-independent constraint networks 101, the applicability of the constraint that is used to compute the value of any variable 122 does not depend on the values of other variables 122 in the constraint network 100.

Figure 2A:
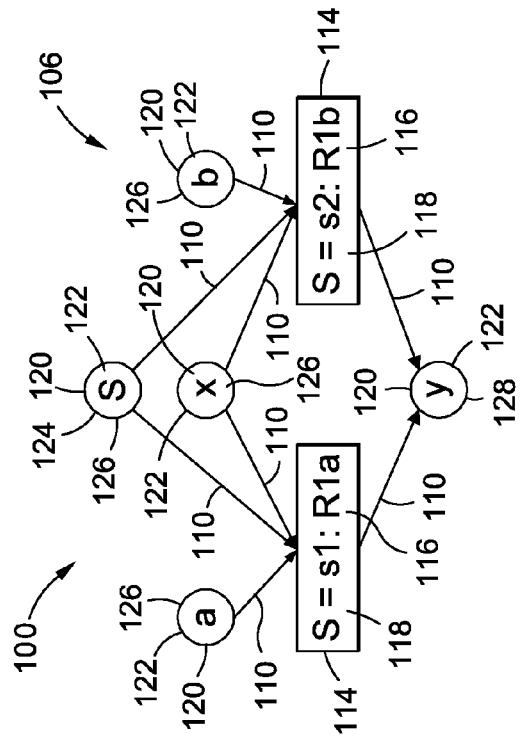
FIG. 2A is a diagrammatic illustration of a data-dependent constraint network having two equality constraints interconnected to the five variables.
Figure 2B:
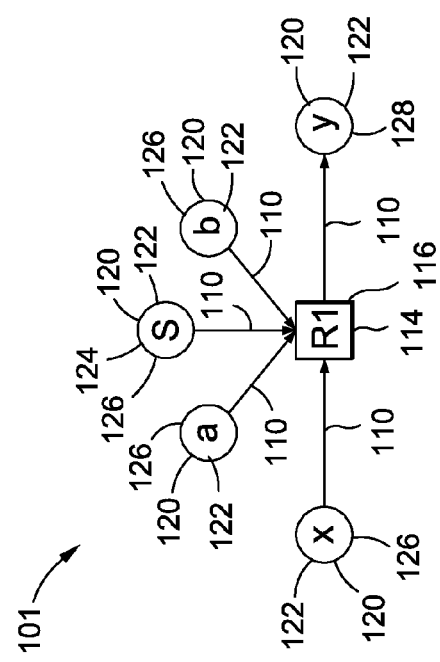
FIG. 2B is a representation of the equality constraints represented by the relation nodes of FIG. 2A.

FIG. 2A is a diagram of a data-dependent constraint network 100 represented as a bipartite graph 106 having relation nodes 114 and variable nodes 120 interconnected by arcs 110. The relation nodes 114 represent equality constraints, R1a, R2a. The variable nodes 120 represent the five variables, x, a, S, b, and y. FIG. 2B illustrates the equality constraints 116 represented by the relation nodes 114 of FIG. 2A. In a data-dependent constraint network 100, an equality constraint 116 is active only when a boolean condition 118 is satisfied. For example, as shown in FIG. 2B, R1a is active if S=s1 and R1b is active if S=s2. The variable S is a state variable 124 which is defined as a special variable that is used in the enabling conditions of equality constraints 116. A state variable 124 comprises either a boolean variable (not shown), or a categorical variable 136 having discrete values over a finite domain (e.g., a set of states) known to the constraint network 100.

Figure 3:
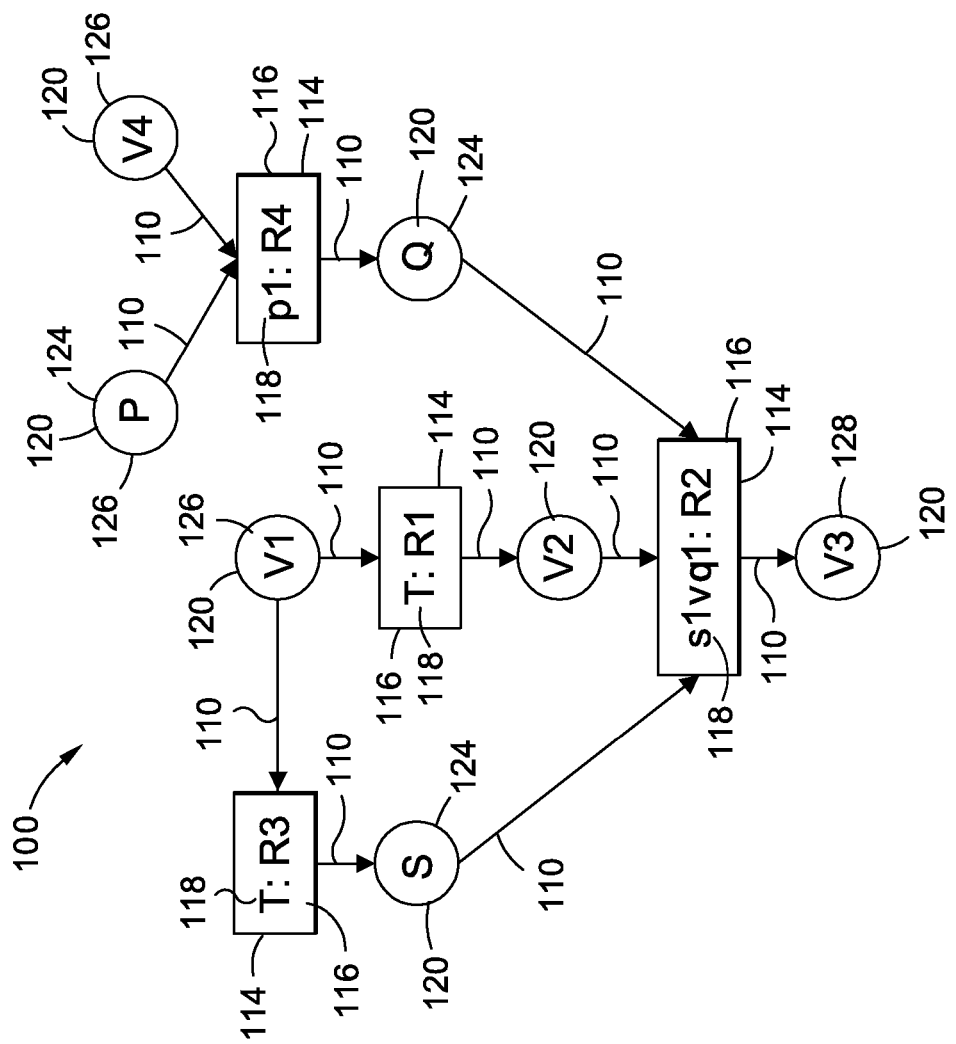
FIG. 3 is a diagrammatic illustration of a data-dependent constraint network having four equality constraints among seven variables including three state variables.

FIG. 3 is an example of a data-dependent constraint network 100 having four relation nodes 114 representing equality constraints, R1, R2, R3, and R4, and seven variable nodes 120 representing seven variables, V1, V2, V3, V4, P, Q, and S. Each relation node 114 includes the name of the constraint, e.g., R2, preceded by a logic expression with implied state variables 124 which must be true for the constraint to be active. In an example, the equality constraints 116 may have the following conditions:

R1: Unconditionally: V2=V1
R2: When S=s1 Or Q=q1: V3=V2+2:
R3: Unconditionally: S=If(V1<10, s1, If(V1<20, s2, s3))
R4: When P=p1, Q=If(V4<5, q1, q2)

In the constraint network 100 of FIG. 3, the variables P, Q, and S are state variables 124 having discrete values in a finite set as indicated above. In the example above, P ranges over the values, {p1, p2}, S ranges over the values, {s1, s2, s3}, and Q ranges over the values {q1, q2}.

Figure 4:
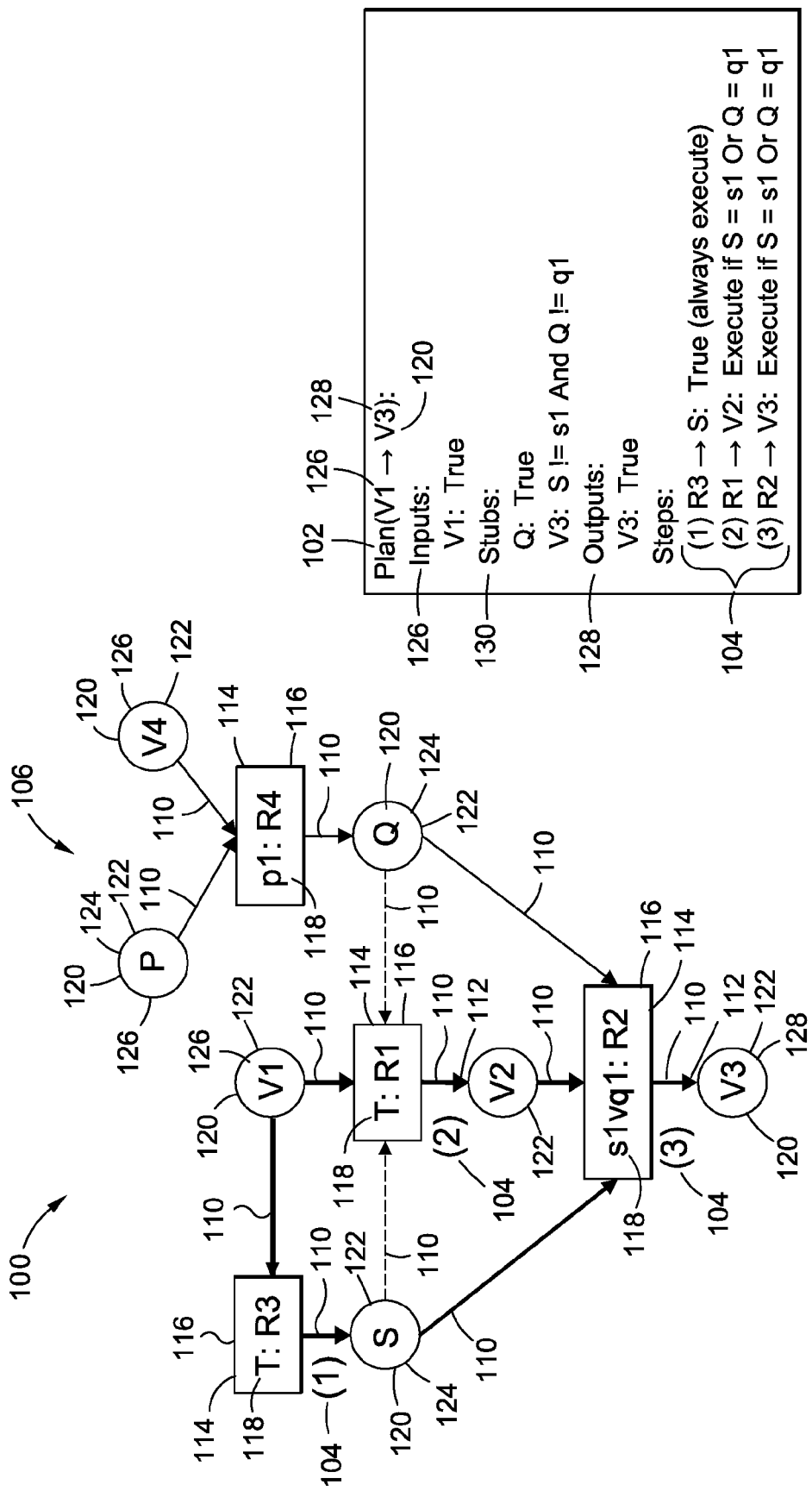
FIG. 4A is a diagrammatic illustration of the constraint network of FIG. 3 wherein the highlighted arcs graphically illustrate plan steps (1), (2), and (3) of a computational plan from input variable node V1 to output variable node V3.
FIG. 4B is a listing of the values for the inputs, the outputs, and the plan steps (1), (2), and (3) of the computational plan from input variable node V1 to output variable node V3 of the constraint network of FIG. 4A.

FIG. 4A is a diagram of the constraint network 100 of FIG. 3 with the bolded arcs 110 illustrating plan steps (1), (2), and (3) indicated by ref. No. 104. The plan steps 104 may be included in a computational plan 102 from input variable node V1 to output variable node V3. In the present disclosure, an input variable node is interchangeably referred to as an input variable, an input node, or an input. An output variable node is interchangeably referred to as an output variable, an output node, or an output. A data dependent constraint network is interchangeably referred to as a constraint network or a network. A conditional computational plan is interchangeably referred to as a conditional plan, a computational plan, or a plan.

Advantageously, in the present disclosure, a computational plan 102 from an input 126 (e.g., an input variable node) to an output 128 (e.g., an output variable node) may be determined for a data-dependent constraint network 100 represented by a bipartite graph 106 using a backward chaining search of the bipartite graph 106 for situations where a search branch 112 (e.g., an arc) is valid, as described in greater detail below. The computational planning process involves the use of mutually recursive routines as described below for tracking the situations in which a given search branch 112 is valid for a given world set. As described below, a world 138 (FIG. 7) comprises a complete specification of the value of all of the state variables 124 in the constraint network 100. A world set 140 (FIG. 7) is a set of worlds 138 and is defined by a defined by a well formed formula (WFF) 142 (FIG. 7) involving the state variables 124. In FIG. 4A, the dashed arcs 110 indicate the dependence of the search state on state variables 124. In the present disclosure, a variable is dependent, independent, or undetermined in a world set if it is respectively dependent, independent, or undetermined in all of the worlds of the world set. A maximal world set associated with a variable being dependent, independent, or undetermined is the set of all worlds in which that variable is respectively dependent, independent, or undetermined.

FIG. 4B illustrates a computational plan 102 from the input 126 variable node V1 to the output 128 variable node V3 for the constraint network 100 of FIG. 4A. As disclosed herein, a plan 102 for a constraint network 100 comprises a list of arcs 110 and a condition under which the relation (e.g., the equation represented by the relation node) attached to the arc 110 is to be used to compute the variable 122 attached to the arc 110. A plan 102 may also include a list of strong components 132 (FIG. 6B) representing fundamental cycles in the bipartite graph 106.

In a plan 102, each one of the arcs 110 and/or strong components 132 may be ordered in such a manner that one may check the applicability of a plan step 104 of the plan 102 based on the values of variables 122 already computed by the plan 102 or based on variables 122 that are otherwise available outside the plan 102. Variables 122 that are available outside of the plan 102 are described as stubs 130 to the plan 102. Stubs 130 are located immediately upstream of the plan steps 104 of the plan, but are not part of the plan 102. The values of the stubs 130 are required for performing the computations of the plan 102. In FIG. 4A, Q is a stub 130 to the plan from variable V1 to variable V3. Variable V3 is a special case of a stub 130 when the plan 102 does not have a computational path from V1 to V3 as would be the case in the example (FIG. 4A) if neither S=s1 nor Q=q1.

Figure 5:
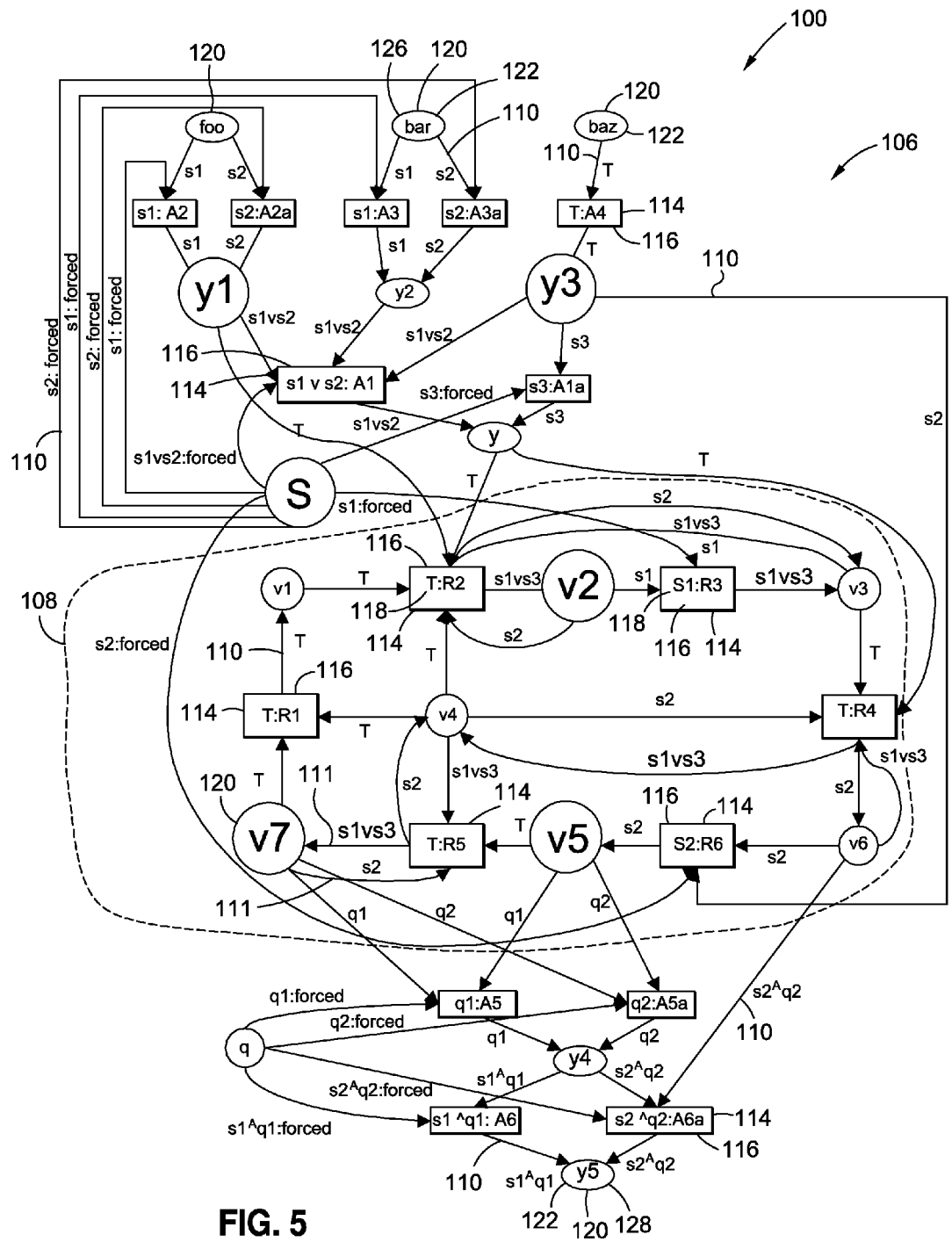
FIG. 5 is a diagrammatic illustration of a constraint network having a region with overlapping strong components and wherein each one of the equality constraints is preceded by a condition on a state variable.

FIG. 5 is a diagram of a data-dependent constraint network 100 having a region with overlapping strong components 108 encircled by a dashed line. The constraint network in FIG. 5 also includes arcs 110 having alternative directions 111 between a relation node 114 and a variable node 120. In the constraint network 100 as disclosed herein, each one of the equality constraints 116 is shown as a rectangle with the name of the equality constraint 116 preceded by a boolean condition 118 on a state variable 124. For example, in FIG. 5, the upper left-hand equality constraint, A2, is active when the state variable S=s1. The equality constraint, A2a, is active when the state variable S=s2. The notation, T, as in T: R2, indicates that the equality constraint, R2, is unconditionally active and is in the True state.

Figure 6A:
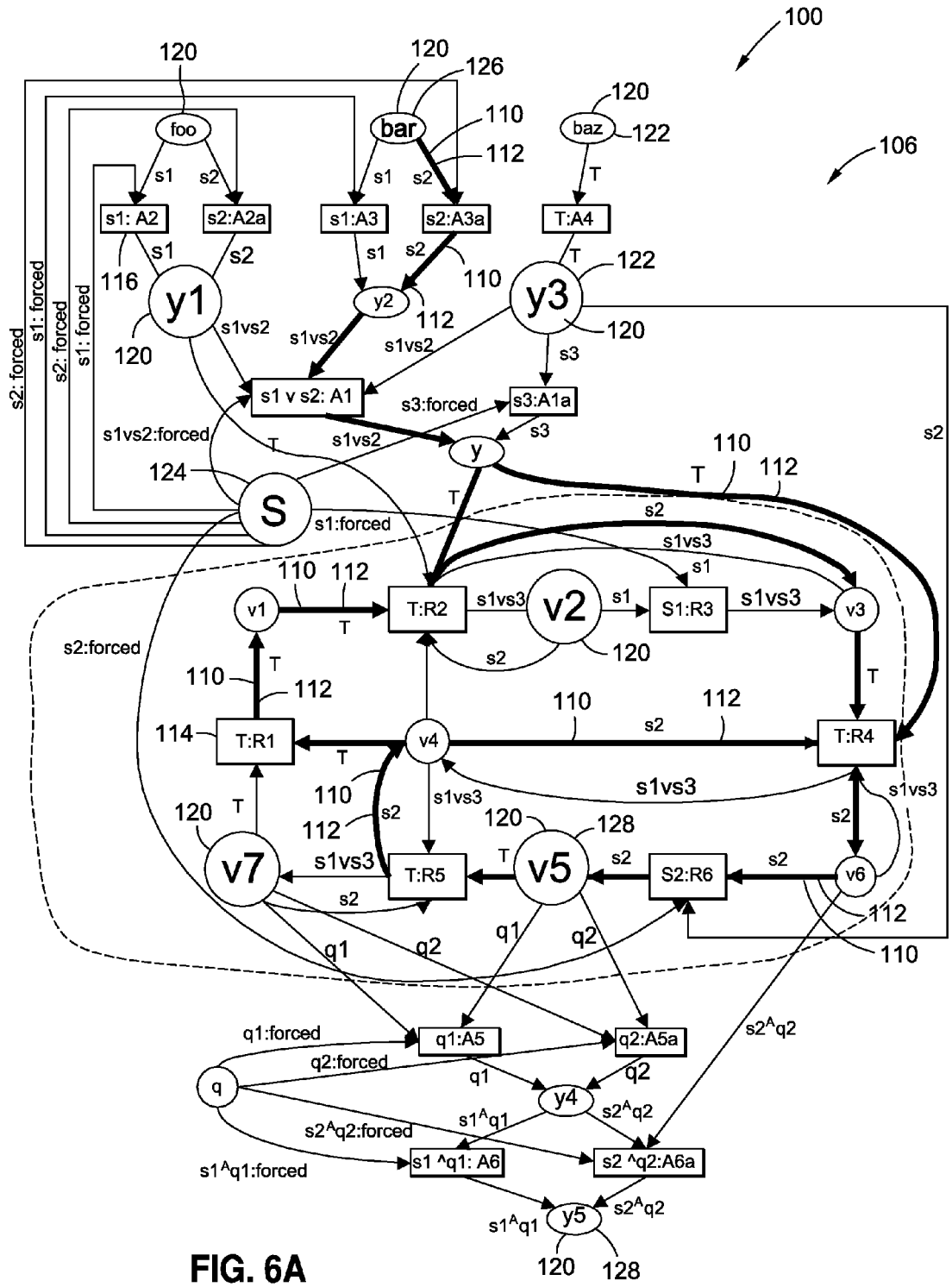
FIG. 6A is a diagrammatic illustration of the constraint network of FIG. 5 wherein the highlighted arcs graphically illustrate the plan steps of a computational plan from input variable node bar to output variable node v5.
Figure 6B:
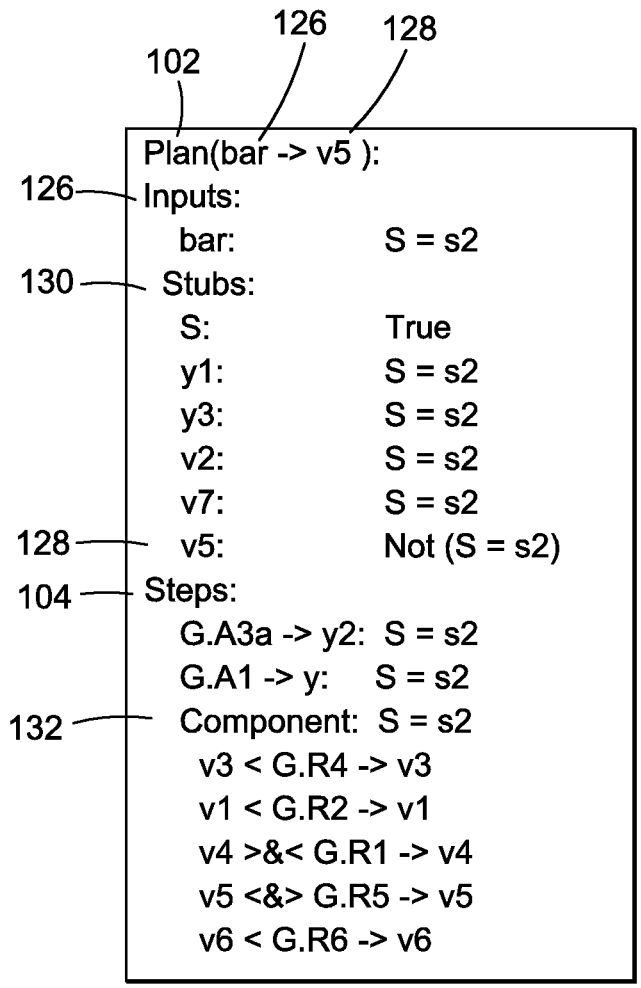
FIG. 6B is a listing of the values for the input, the output, and the plan steps of the computational plan from input variable node bar to output variable node v5 of the constraint network of FIG. 6A.

FIG. 6A is a diagram of the constraint network 100 of FIG. 5 wherein several of the arcs 110 and strong components 132 are bolded to indicate that such arcs 110 and strong components 132 are included in the plan steps 104 of the plan 102 from input variable node "bar" to output variable node v5. FIG. 6B shows a chart that lists the values for the input 126, the output 128, and the specific plan steps 104 of the plan 102 from input "bar" to output v5 of the constraint network 100 of FIG. 6A. Also shown are the stubs 130 to the plan 102 which are variables 122 that are located immediately upstream of the plan steps 104 of the plan 102 but which are not computed by the plan. In the chart of FIG. 6B, S, y1, y3, v2, v7, and v5 are stubs 130 to the plan from "bar" to v5.

Referring to FIG. 7, in the present disclosure, a world 138 is defined as a complete specification of the value of all of the state variables 124 in a constraint network 100. As an example, if Q is a boolean variable 134 and S is a categorical variable 136 with the possible values in {s1, s2, s3} and if Q and S are the only state variables 124 in the constraint network 100, then there are six possible worlds:

1. Q And S=s1
2. Q And S=s2
3. Q And S=s3
4. Not(Q) and S=s1
5. Not(Q) and S=s2
6. Not(Q) And S=s3

In FIG. 7, shown is a table listing the world sets 140 involving the boolean 134 state variable Q and the categorical 136 state variable S with values in {s1, s2, s3}. As indicated above, a world set 140 is defined by a well-formed formula (WFF) 142 involving state variables 124. World sets 140 may comprise arbitrary logical forms involving the operators And, Or, Not, and the predicates involving the state variables 124. A constraint management system may include routines for converting logic sentences to either conjunctive normal form or disjunctive normal form, while simultaneously using the finite domain properties for the state variables to simplify negations, and unions. An example of performing a simplification may be disclosed in application Ser. No. 13/422,335 filed on Mar. 16, 2012, and entitled SYSTEM AND METHOD FOR RAPID MANAGEMENT OF LOGIC FORMULAS.

Figure 8:
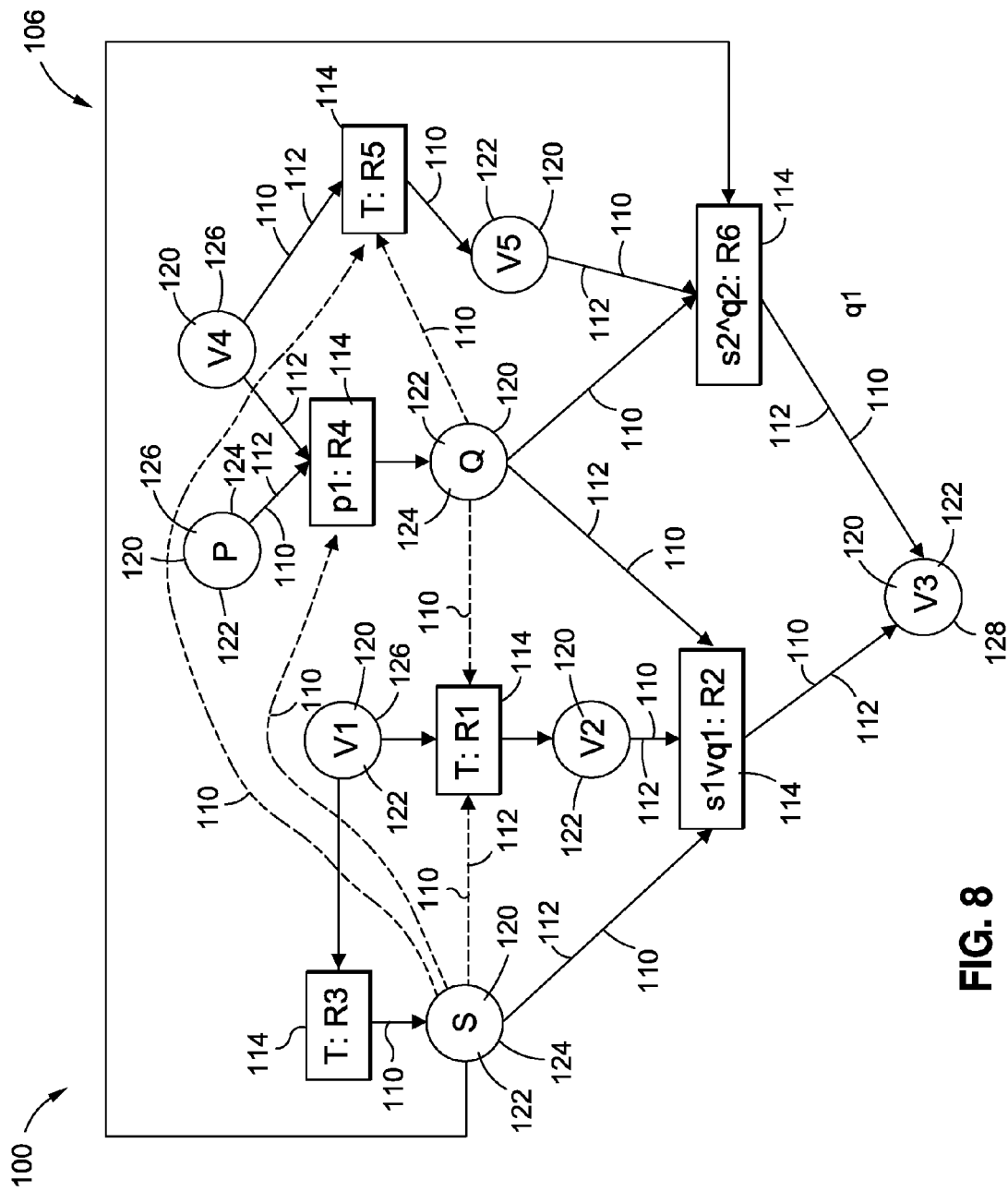
FIG. 8 is a diagrammatic illustration of a constraint network having ghost arcs illustrated in dashed font and wherein such ghost arcs may be added between a relation node and a state variable if the state variable is contained in a world set that is associated with the search branch getting to the relation node.

FIG. 8 is a diagram of a bipartite graph 106 defined by a data-dependent constraint network 100 for which a computational plan 102 (FIG. 6B) may be determined. The method of determining the plan 102 may include selecting or specifying variable nodes 120 as inputs 126 representing starting points for the plan 102, selecting or specifying variable nodes 120 as outputs 128 to be computed by the plan 102, and defining the world set 140 (FIG. 7) in which one wants the plan 102 to be valid. If input 126 variables are not specified, then all the input 126 variables in the constraint network 100 that influence the value of the output 128 variable(s) are computed by the method to use as the input 126 variables. The method of determining the plan 102 starts in a state where the specified input 126 variables are already in the independent state.

The method herein includes moving or traversing through the constraint network 100 from the inputs 126 to the outputs 128 during a backward chaining search of the bipartite graph 106. During the search process, a relevant or appropriate world set 140 is maintained along each branch of the search. The search may start with a variable 122 (e.g., an output variable node 120) and may proceed up through the variable's incoming arcs 110, each for a different world set 140, to the relation node 114 that is connected to the variable's incoming arcs 110. The process then moves upstream of those relations through their incoming arcs 110 to the variables 122 attached to the relation's incoming arcs 110. The process is recursive at the new variables 122 located upstream of the relations, as described in greater detail below.

The method may further include specifying a world set 140 in which the computational plan 102 is desired. If world set 140 is not specified, the method automatically computes the maximal world set 140 in which the output 128 nodes are in a determined state. The result computed or determined by the method is a computational plan 102 containing an input list 220, an output list 218, a stub queue 234, and a plan queue 236. In the present disclosure, input list is used interchangeably with input queue, and output list is used interchangeably with output queue. The elements of the input list 220 comprise an association between an input 126 variable and an input 126 variable world set 140 wherein the input 126 variable world set 140 is the maximal world set 140 in which the input 126 variable is independent and wherein one or more of output 128 variables are dependent on that input 126 variable in that world set 140. The elements of the output list 218 comprise an association between a variable node 120 and the maximal world set 140 in which the variable node 120 is determined. A plan queue 236 comprises an ordered list of plan steps having elements comprising an association between a plan step and the world set 140 in which the plan step is to be executed. A plan step comprises either (1) an arc 110 associated with a computational method to compute a value of a single one of the variable nodes 120 or, (2) a component 132 associated with a computational method to simultaneously compute the value of a plurality of the variable nodes 120 in the component 132. The elements of a stub queue 234 comprise an association between a stub variable node 120 and a world set 140. A stub 130 variable is any variable 122 that is needed in one or more plan steps but is independent of any of the specified input 126 variables, and the world set 140 associated with that stub 130 variable is the world set 140 in which the stub 130 variable is needed to evaluate the one or more plan steps.

In the method disclosed herein, if inputs 126 are specified as arguments to the method, the method updates the input list 220 by adding the input 126 to the input list 220 along with any specified world set or True world set. The method updates the output list by adding the output variable node 128 and the specified world set 140 to the output list if the output variable node 128 is in a determined state for the entirety of the specified world set 140, and then updates the conditional plan 102 using a backward chaining search along a search path by recursively performing the following operations: finding the plan for a variable node 120 in a given world set 140; finding the plan for a component 132 in a given world set 140; finding the plan for a relation node 114 in a given world set 140; and finding the plan for arcs 110 in a given world set 140. During the backward chaining search, the presently-disclosed method uses the following operations to update the conditional plan 102—adding plan step; adding plan stub; adding plan input; and adding plan output. The world sets 140 that are applied during such operations evolve during the backward chaining search according to the nature of the arc 110 and relation 114 conditions, as described below. When the above-noted process is completed for all of the output 128 variables, the method includes a "FinalizePlan" 214 routine to complete the plan 102, and return the completed conditional plan 102, as illustrated in FIGS. 9A-20B and described in greater detail below.

The recursive operations comprising the backward chaining search start with finding a plan 102 for a variable node 120 which, in turn, follows the inflow arcs 110 backwards along a search path. In the present disclosure, an inflow arc 110 is interchangeably referred to as an incoming arc 110. It should be noted that the enabling world sets 140 for the inflow arcs 110 associated with a given variable node 120 are, by necessity, disjoint. The world set 140 that is used for the next element along an inflow arc 110 will be the intersection of the arc's enabling world set and the incoming world set. Each inflow arc 110 leads to either finding a plan for a component 132 (e.g., using the "FindPlanForComponent" 222 routine—FIG. 14A) if the arc 110 is part of a component 132, or finding a plan for a relation (e.g., using the "FindPlanForRnode" 224 routine—FIG. 15A) if the arc 110 is not part of a component 132. These methods in turn call on the routine "FindPlanForArcs" 228 (FIG. 16A), on all the arcs 110 of the component 132 predecessors or relation inflow arcs 110, depending on the case, and removing state variable dependence as needed.

As the search path is traversed through a relation node 114, component 132, variable node 120, or along an arc 110, the method maintains the appropriate world set 140 along the path as the intersection of the evolving world set 140 with each enabling world set 140 of the elements in the path. The method may initially note or determine whether any search path starting with a predecessor arc 110 of a plan step ends at a specified input 126 variable node 120 and, if so, update the stub queue 234 with a stub variable and an associated stub world set 140. The stub variable comprises the variable associated with any other predecessor arc 110 whose search paths do not terminate at any of the specified input 126 variables. The stub world set comprises the union of the world sets 140 of those search paths.

The method or process for finding (e.g., determining) a computational plan 102 may be described by way of example with reference to FIG. 8. In a process for determining a computational plan 102 from variable node v4 to v3, the plan 102 may be initialized with an input 126 list with the variable v4 in the False world set. The world set may be later amended as search paths are determined from v3 back to v4 in different world sets. The process may start at variable node v3 in the True world, and may include searching along v3's incoming arcs, R2->v3 and R6->v3. Without loss of generality, it is assumed that the first search R6->v3 has an associated world set of $S=s2\hat{}Q=q2$. The search may continue to the incoming arcs to R6 (v5->R6, Q->R6, S->R6) with return of "success" if one of the input nodes is found along any path. For example, the process may include searching v5->R6 with associated world set True. Conjoining True with the current world set, $S=s2\hat{}Q=q2$, results in $S=s2\hat{}Q=q2\hat{}T$, which simplifies to $S=s2\hat{}Q=q2$.

Referring still to FIG. 8, the process may continue with a search of the upstream arcs of v5, of which there is only one, R5->v5, and eventually finishing at node v4 in world set $S=s2\hat{}Q=q2$, such that v4 is added to the plan input list 220 disjoining the world set 140 previously associated with v4 with the world set 140 that was used to get to v4 along the current search branch. At this stage, the world set 140 is $(S=s2\hat{}Q=q2)vFalse$, which simplifies to $S=s2\hat{}Q=q2$. Continuing the process will result in arriving at v4 in world sets $P=p1\hat{}S=s2$, and other world sets 140. The final result is that v4 is an input to the plan to v3 in the world set $(P=p1\hat{}Q=q2)V(P=p1\hat{}S=s2)$, and wherein there is no plan in the negation of this world set.

In the present disclosure, the system and method advantageously provides a means for handling a scenario wherein a state variable 124 is encountered in the search path and the world set 140 of the search branch 112 to that state variable 124 includes the same state variable. Such a scenario is illustrated in FIG. 8 when going up the Q->R6 arc 110 and a plan is still needed for Q. In this scenario, Q must be removed from the world set 140 before proceeding further, because the execution of a plan to determine a state variable 124 such as Q cannot depend on the value of that state variable 124 in any of the predecessors to computing the state variable 124. The new world set 140 would therefore become S=s2 only. The process would include going up the incoming arcs of Q to R4, conjoining the enabling state of R4, which is P=p1, with S=s2, which returns $P=p1\hat{}S=s2$. Going up the incoming arcs arrives at v4 again in the state $P=p1\hat{}S=s2$. A different search branch arrives at v4 in state $S=s1\hat{}P=p1$. The Q dependence is removed when going through the node Q.

A further advantage provided by the system and method disclosed herein is the addition of a search branch 112 from a relation to a given state variable 124 even if the relation does not depend on the state variable 124. Such a search branch 112 is added if that state variable 124 is contained in the world set 140 associated with the search branch 112 getting to that relation. Added search branches 112 are defined as ghost arcs 110 and are shown in dashed font in FIG. 8. The requirement to add such search branches 112 is a result of the requirement that a state variable 124 must be a predecessor of the plan 102 going through the relation if the execution of the relation will be conditioned by a world set 140 containing the state variables 124.

In the present disclosure, provided is a method for creating, determining, or finding a computational plan 102 (FIG.

6B) for computing the values of a user specified set of output variables 122 (FIG. 8) from a user specified set of input variables 122 of a data-dependent constraint network 100 (FIG. 8) represented by a bipartite graph 106. The presence of one or more equality constraints in the constraint network 100 may depend upon the values of one or more variables 122 in the constraint network 100. A significant advantage of the disclosed method is the avoidance of intermixing of planning and computation as required by traditional conditional planning methods. The avoidance of intermixing of the planning and the computation results in a significant reduction in the amount of time required to perform the computational steps during trade studies that explore different regions of a design space.

The presently-disclosed system and method imposes conditions on the nature of the data-dependent constraint network 100 (FIG. 8) that are required for operation of the system and method. The data-dependent condition on each relation in the constraint network 100 is specified by a well-formed formula (WFF) which, as indicated above, is a logical sentence formed using AND, OR, and NOT operators connecting base predicates over finite domains. In the present disclosure, the value of any variable 122 involved in a condition on an equality constraint 116 (FIG. 8) must be over a known finite range. For example, the value of an engine in a hypersonic vehicle study may vary over the engine types: "rocket", "ramjet", "scramjet", and other engine types. Variables 122 with continuous values such as aerodynamic drag cannot be used directly as conditioning values for a relation. Rather, in the present disclosure, such variables 122 may be quantized into a finite set for conditioning purposes. For example, the quantized variable "dragLevel" may be defined with a constraint such as dragLevel=Case ({drag<x1, "negligibleDrag"}, {drag<=x2, "lowDrag"}, {Else, "highDrag"}) and then different equality relations may be conditioned for computing flight behavior dependent on the value of dragLevel.

Referring now to FIGS. 9A-20B, shown are routines and the corresponding pseudo code that may be implemented in a method for determining a computational plan 102 (FIG. 6B) for a data-dependent constraint network 100 (FIG. 8) represented by a bipartite graph similar to the bipartite graph 106 illustrated in FIG. 8. The routines shown in FIGS. 9A-20A may include one or more functions to facilitate the determination of the computational plan 102. Such routines may be written into programming instructions for the method and/or the routines may be included in the underlying programming language. The following comprises a brief description of functions, objects, and object attributes that may be included in the routines.

mode: a relation node in the bipartite graph.
vnode: a variable node in the bipartite graph.
arc: an arc connecting a given vnode to a given mode.
graph: either the top level bipartite graph or a strong component within that graph.
ArcRnode(arc): the mode connected to the given arc.
ArcVnode(arc): the vnode connected to the given arc.
RnodeArcs (mode): the set of arcs connected to the given mode.
VnodeArcs (vnode): the set of arcs connected to the given vnode.
Union(ws[1], ws[2], . . . ): the disjunction or union of all the worlds specified in the input list of world sets, ws[1], ws[2], . . . .
Intersection(ws[1], ws[2], . . . ): the conjunction or intersection of all the worlds specified in the input list of world sets, ws[1], ws[2], . . . .

ComponentVnodes(component): The vnodes that are in the strong component.
ComponentPredecessorArcs (component): The predecessor arcs of the strong component defined as arcs that point into relations in the components enabling world set.
EnablingWorldSet(object): The world set in which the object is enabled. This is defined for vnodes, modes, components, and arcs.
WorldSetStateVariables (worldSet): The state variables that are specific to the specified world set.

In the present disclosure, the system and method for determining a computational plan 102 (FIG. 6B) includes maintaining a set of mappings (not shown) that allow for world set attributes of the nodes. For example, such world set attributes may include a variable node's status such as: the world set in which the variable node is independent, the world set in which the variable node is undetermined, the world set in which the variable node is determined by different equality constraints, and other attributes. The domain of a world set mapping is a partition of the nodes enabling world set comprising the union of all worlds in which the variable node has an existence. For example, given a relation node with enabling world set "rnodeWS", the world set mapping for the outgoing arcs attribute (e.g., an outgoing arc of a relation node points to the variable that the relation node is defining in the given world set) may be defined as follows:

$$ws_1 \to arc_1$$
$$ws_2 \to arc_2$$
$$\ldots$$
$$ws_i \cap ws_j = \phi$$
$$ws_i \neq \phi$$
$$\bigcup_i ws_i = rnodeWS$$
$$arc_i \neq arc_j$$

In the present disclosure, the constraint network 100 maintains the above-described world set attribute maps, and includes procedures for re-partitioning an attribute map with respect to a specified world set, as represented by the following function:

output Map<-RepartitionMap(inputMap, worldSet)

wherein outputMap is generally the same as the inputMap (not shown) except that outputMap is restricted to worldSet. In the present disclosure, restructuring may be required to ensure that the outputMap is a partition of worldSet in the sense that, when intersecting worldSet with the elements in the original inputMap, some of the intersections may be empty and therefore may not be present in the resultant map.

In the present disclosure, the constraint management system or constraint network 100 (the terms being used interchangeably herein) may include the following lookup functions:

WorldSetValue(attributeMap, worldSet)

which may return the attribute specified by the given world set if and only if worldSet is subsumed by (i.e., equals or is a proper subset of) only one of the world sets in the attributeMap, otherwise, the lookup function WorldSetValue 230 (FIG. 15A) returns empty.

For the pseudo code illustrated in FIGS. 9B-20B, the following world set attribute maps may be managed by the constraint network 100:

InflowMap(vnode): The mapping from a world set to the arc directed toward the given vnode in that world set.

OutflowArcs (mode): The mapping from a world set to an outflow arc from the relation in that world set. An outflow arc in a given world set is nothing more than an arc whose direction is pointing away from the mode in the given world set.

StatusMap(vnode): The mapping from a world set to the status attribute of the vnode in the given world set.

ArcGraphs(arc): An arc can be in multiple strong components as well as in no strong component in different world states. This world set attribute records the mapping from a world set to the strong component the arc is in for the given world set as well as a map from a world set to the top level constraint graph for the world set for which the arc is not in any strong component.

ArcDirectionMap(arc): A mapping from a world set to the direction of the arc—either towards the vnode, towards the mode, or undirected.

The pseudo code illustrated in FIGS. 9B-20B may also include the following functions for defining a specific data structure for a plan which may be defined as an object having the following attributes:

inputQueue(plan): the set of input variables to the plan.

outputQueue(plan): The set of output variables to the plan.

stepStack(plan): The ordered set of step objects in the plan. Each step object is a pair <worldSet, step> where the step is to be executed if we are in one of the worlds in worldSet, and step is either an arc connecting an upstream mode to its immediate downstream vnode in the given worldSet or a strong component in that worldSet.

stubQueue(plan): The set of stub variables in the plan. Stub variables are variables immediately upstream of some step (i.e., arc or strong component) in the plan, but which is not downstream of any of the plan inputs. The values of the stub variables are required when executing the plan steps.

Figure 9A:
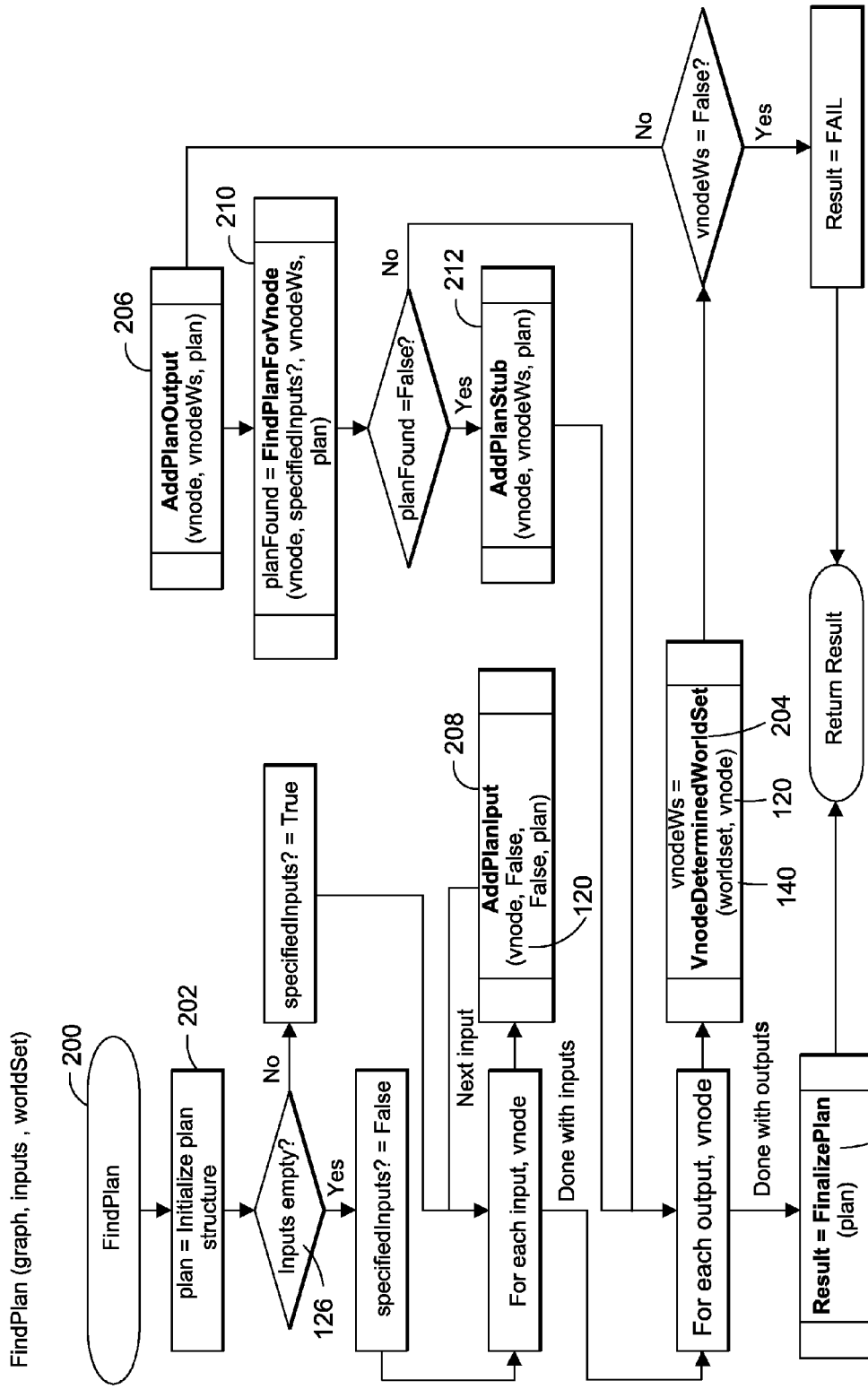
FIG. 9A is a flow diagram illustrating one or more operations that may be included in a high-level method of determining a computational plan for a data-dependent constraint network.

Referring to FIGS. 9A-9B, shown in FIG. 9A is a flow diagram having one or more operations that may be included in a method for finding (e.g., determining) a computational plan 102 (FIG. 6B) for a data-dependent constraint network 100 (FIG. 8). FIG. 9B is a pseudo-code listing of a high-level routine "FindPlan (graph, inputs, outputs, worldSet)" for finding (e.g., determining) a computational plan 102 for a data-dependent constraint network 100 in the manner illustrated in FIG. 9A. As indicated above, the constraint network 100 is represented by a bipartite graph 106 (FIG. 8) containing variable nodes 120 (FIG. 8) and relation nodes 114 (FIG. 8) interconnected by arcs 110 (FIG. 8). The "FindPlan" routine 200 returns either the plan 102 from "inputs" (e.g., input variable nodes) to "outputs" (e.g., output variable nodes), or the "FindPlan" routine 200 returns "Fail" if one or more of the outputs is not determined in the constraint network 100. The arguments in the routine 200 include:

graph: a structure representing the bipartite graph defined by the data-dependent constraint network.

outputs: a list of variables that the plan computes.

inputs: a list of variables that comprise starting points for the plan.

worldSet: the world set in which the plan is determined to be valid.

The routine "FindPlan" 200 may include initializing the plan structure 202 as described below. In the "FindPlan" 200 routine, if no inputs 126 are specified in the arguments list, then the computational plan 102 will contain as inputs 126 all independent variables 122 that are located upstream of the outputs 128. If inputs 126 are specified, then the inputs 126 for the computational plan 102 will be restricted to the inputs in the specified arguments list. For each input 126, the routine "AddPlanIput" 208 may be implemented to add variable nodes 120 to an input queue 220 of the plan 102 as described below. For each output 128, a routine "VnodeDeterminedWorldSet" 204 may be implemented to determine a world set 140 in which a status of the variable nodes 120 is determined. A routine "AddPlanOutput" 206 may also be implemented for each output 128 to update the output queue for that output 128. In addition, for each output 128, a routine "FindPlanForVnode" 210 may be implemented to find a plan 102 for a given variable node 120. The routine "AddPlanStub" 212 may also be implemented to update the stub queue for each stub variable found during the backward chaining search process as described below. The routine "FinalizePlan" 214 may finalize the plan 102 by reversing the order of plan steps (not shown) determined in "FindPlan".

Figure 10A:
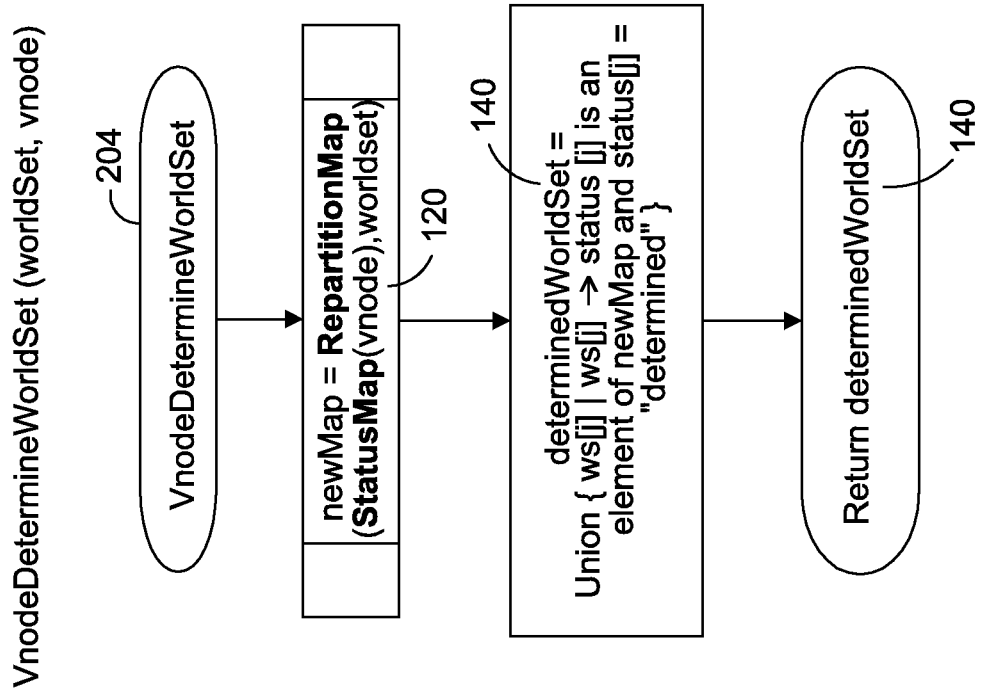
FIG. 10A is a flow diagram illustrating one or more operations that may be included in a method of determining a world set in which a status of the variable nodes is determined.

Referring to FIGS. 10A-10B, shown in FIG. 10A is a flow diagram having one or more operations that may be included in the routine "VnodeDeterminedWorldSet(worldSet, vnode)" 204. The routine 204 may be configured to determine a world set 140 in which a status of the variable nodes 120 is determined (either dependent or independent.) FIG. 10B is a pseudo-code listing of the routine "VnodeDeterminedWorldSet" 204 illustrated in the flow diagram of FIG. 10A. The routine returns the world set 140 in which the status of the vnode 120 (i.e., variable node) is determined. The routine 204 incorporates the following arguments:

worldSet: input world set used to partition the vnode status' map.

vnode: the variable node for which the determined world set is needed.

Without loss of generality, the status attribute map of vnode is assumed to be:

ws[1]->status[1],
ws[2]->status[2],
. . .

wherein ws[j] are world sets that form a disjoint partition of the enabling state of vnode. More specifically, Union (ws[j], j=1, . . . , n)=vnode enabling world set, which is typically True, and ws[i]≠Φ,
ws[i] ∧ws[j]=Φ, and
status[i]≠status[j].

In the routine "VnodeDeterminedWorldSet" 204, the status[j] range over values that allow the constraint network 100 (FIG. 8) to determine if the node has an arc 110 (FIG. 8) pointing to it in the ws[j]: is independent in the ws[j], is dependent in the ws[j], etc. Arcs 110 have a direction attribute map in the sense that an arc 110 can be directed toward their mode 114 (FIG. 8), directed toward their vnode 120 (FIG. 8), or undirected simultaneously but in different world sets 140. In the present disclosure, a vnode 120 may have status "determined" in a world set 140 if and only if it is either (a) "independent" in that world set 140 or a super-set thereof or, (b) it has an arc 110 whose direction is toward the vnode 120 in the given world set 140 and the immediately upstream vnodes 120 of the mode 114 (i.e., upstream with respect to a given world set 140) attached to that arc 110 are determined in that world set 140.

Figure 11A:
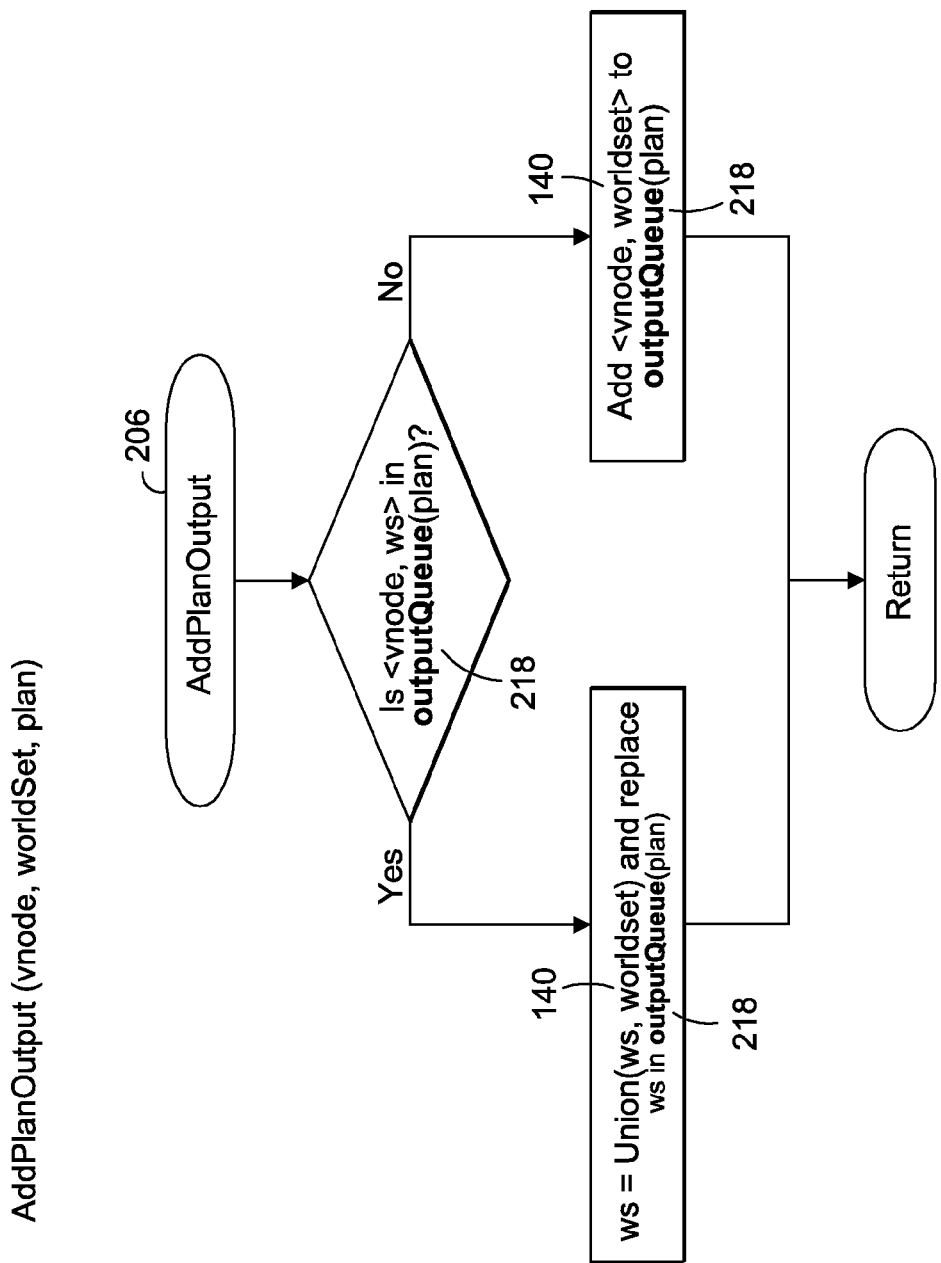
FIG. 11A is a flow diagram illustrating one or more operations that may be included in a method of updating the output queue for the plan.

Referring to FIGS. 11A-11B, shown in FIG. 11A is a flow diagram having one or more operations that may be included in the routine "AddPlanOutput (vnode, worldSet, plan)". The routine 206 is configured to update the output queue 218 for the plan 102. The plan structure may include a stub queue (not shown), a plan queue (not shown), and an output queue

218. FIG. 11B is a pseudo-code listing of the routine "AddPlanOutput" 206 illustrated in the flow diagram of FIG. 11A. "AddPlanOutput" 206 may include the function "outputQueue" 218 and may incorporate the following arguments:

vnode: the output variable being added to the plan.

worldSet: the world set in which vnode is an output variable.

plan: the plan being modified, the structure of which is described below.

As indicated above, the plan structure maintains a stub queue, a plan queue, and an output queue. Each queue comprises a set of ordered entries with each entry includes a world set 140 and an element associated with the world set 140. The elements for the stub queue and output queue 218 are variables 122 (FIG. 8). The elements for the plan queue are either arcs 110 (FIG. 8) or strong components 132 (FIG. 8) representing steps in the plan. For example:

```
output queue =
{ <vnode[1], ws[1]>,
  <vnode[2], ws[2]>,
  ...}
```

Figure 12A:
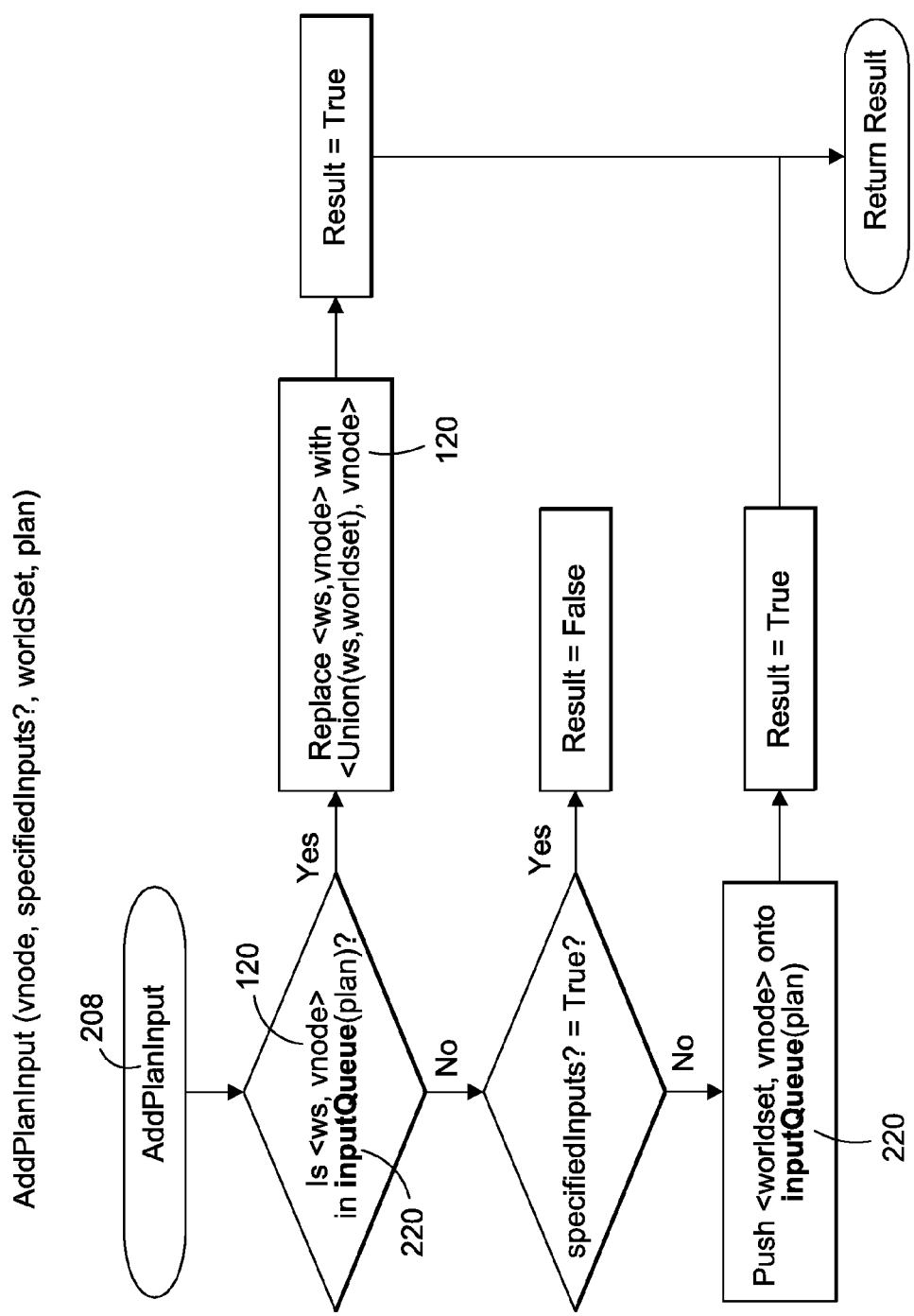
FIG. 12A is a flow diagram illustrating one or more operations that may be included in a method of adding variable nodes to an input queue of the plan.

Referring to FIGS. 12A-12B, shown in FIG. 12A is a flow diagram having one or more operations that may be included in the routine "AddPlanInput (vnode, specifiedInputs?, worldSet, plan)". The routine 208 is configured to add variable nodes 120 and the associated world sets to the input queue 220 of the plan 102. FIG. 12B is a pseudo-code listing of the routine "AddPlanInput" 208 illustrated in the flow diagram of FIG. 12A. If the vnode 120 is not present in the input queue, the vnode and the associated world set are added to the input queue, or if the vnode 120 is already present, then its associated world set 140 is updated. If specifiedInputs? Is False or if the vnode is already present, the routine 208 returns True, otherwise, the routine returns False.

Figure 13A:
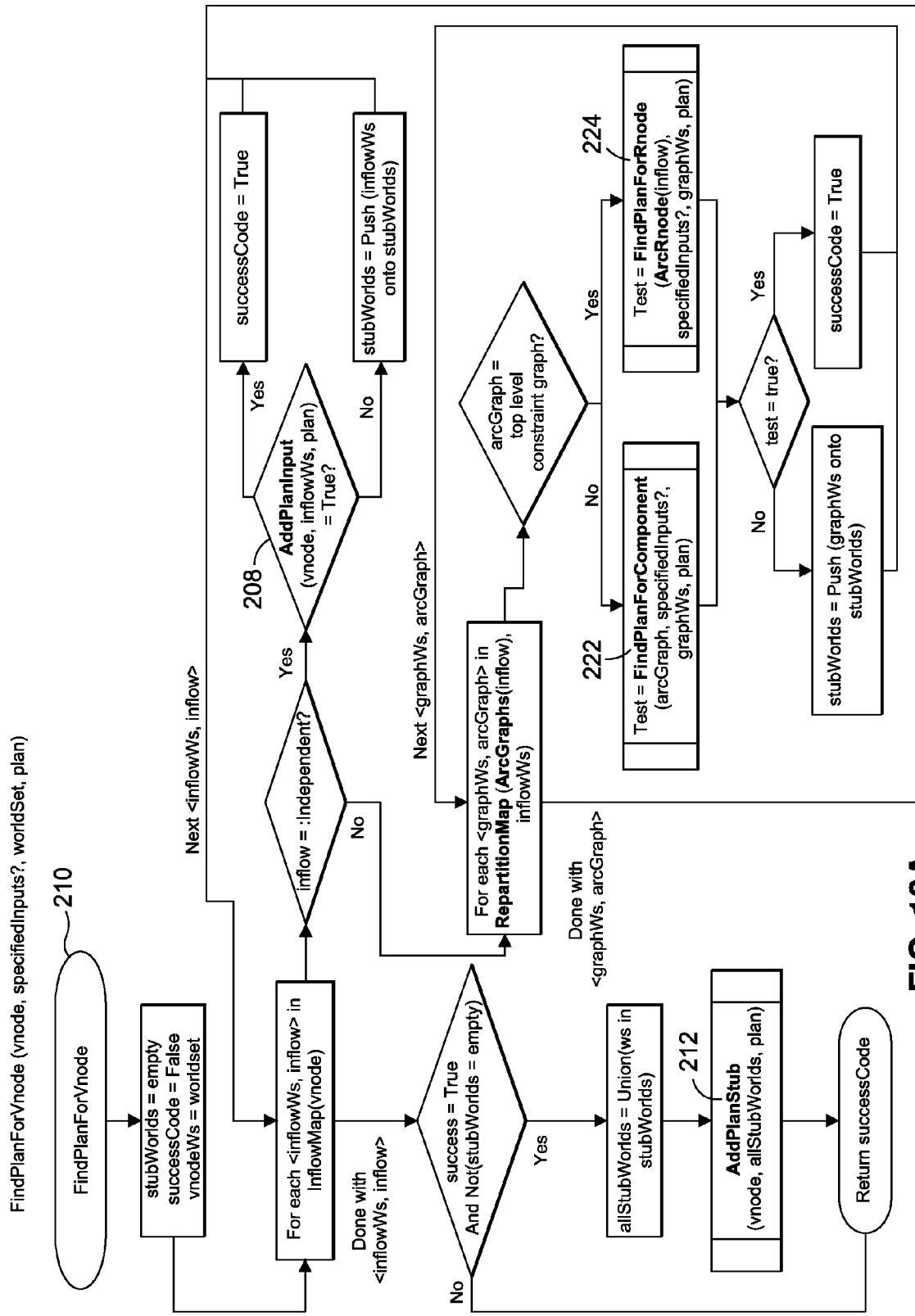
FIG. 13A is a flow diagram illustrating one or more operations that may be included in a method of finding a plan for a variable node in a world set.

Referring to FIGS. 13A-13B, shown in FIG. 13A is a flow diagram having one or more operations that may be included in the routine "FindPlanForVnode (vnode, specifiedInputs?, worldSet, plan)". FIG. 13B is a pseudo-code listing of the routine "FindPlanForVnode" 210 illustrated in the flow diagram of FIG. 13A. The routine 210 may incorporate the following arguments:

vnode: the variable node for which we seek a plan.

specifiedInputs?: If true, then the list of inputs is restricted to user-specified inputs. If false, then any independent variable may be an input to the plan if the variable is located upstream of an output variable.

worldSet: the world set for which the plan is relevant.

plan: the plan structure being modified by this element of the planning process.

The "FindPlanForVnode" 210 routine is mutually recursive with the routines "FindPlanForRnode" 224, "FindPlanForArcs" 228, and "FindPlanForComponent" 222 illustrated in FIGS. 14A-16D and described below. As indicated above, the constraint management system or constraint network 100 is configured to maintain an inflow world set attribute map for each vnode 120. The inflow world set attribute map is a mapping from world sets 140 to arcs 110 where an arc 110 is directed toward a vnode 120 in that world set 140 and/or a world set 140 to a code for :Independent to indicate that the vnode 120 is independent in that world set 140. In the method disclosed herein, the process loops over all of the inflows of the vnode 120, collecting the boolean plan success for each inflow. If any of the inflows return success, then the union of the world sets 140 of failed inflows is where the vnode 120 is added as a stub 130, and the process returns success from such vnode 120. Otherwise, the process returns failure from such vnode 120. If adding plan 102 input 126 ("AddPlanInput" 208) is successful (i.e., does not return nil), then the process returns success from that independent inflow. If an inflow is split into pieces due to the presence of strong components 132, then the pieces are treated as though they are separate inflows.

Figure 14A:
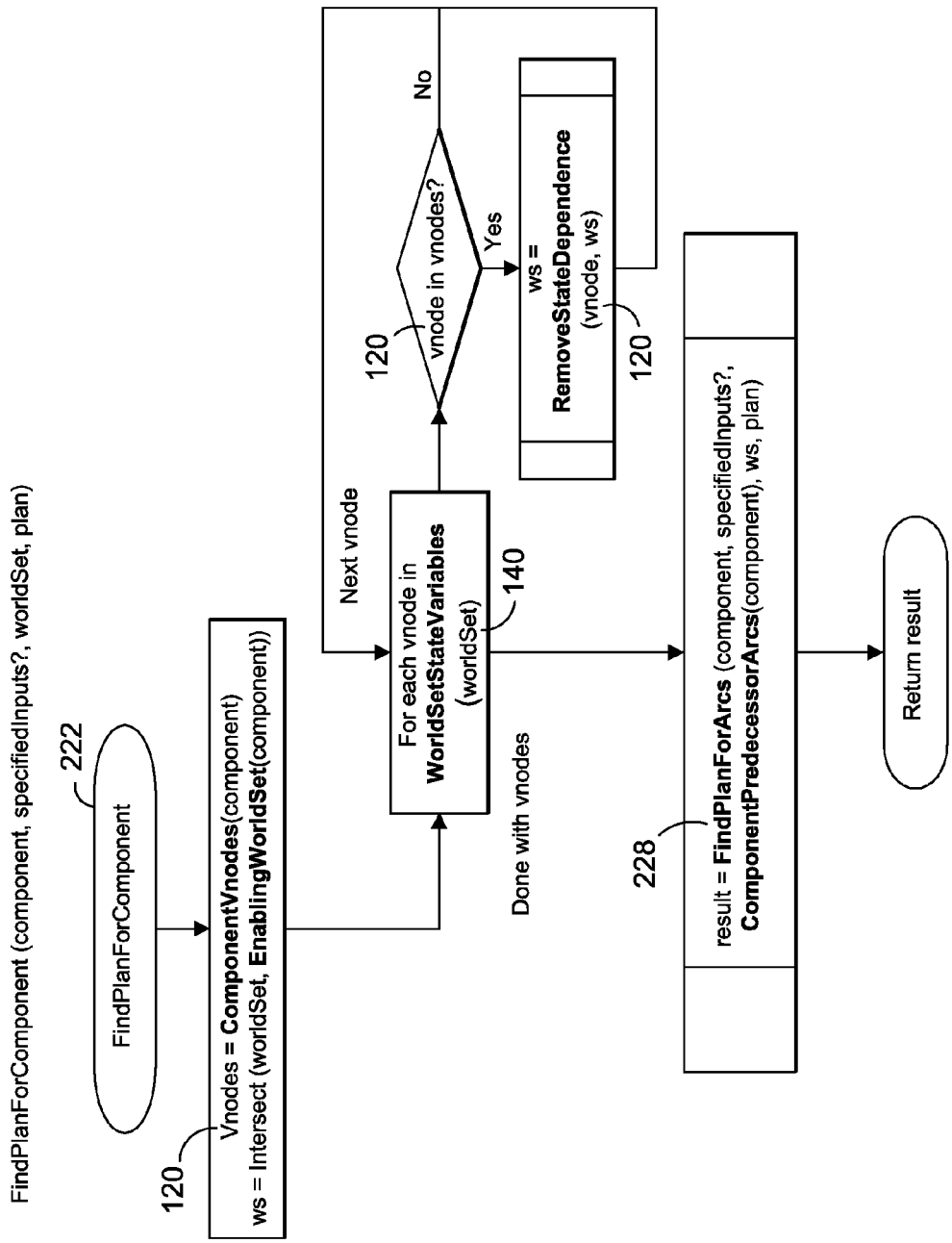
FIG. 14A is a flow diagram illustrating one or more operations that may be included in a method of determining a plan for a strong component in a world set.

Referring to FIGS. 14A-14B, shown in FIG. 14A is a flow diagram having one or more operations that may be included in the routine "FindPlanForComponent (component, specifiedInputs?, worldSet, plan)". The routine 222 is configured to return True or False, depending upon whether the routine succeeds in finding a plan 102 for a strong component. FIG. 14B is a pseudo-code listing of the routine "FindPlanForComponent" 222 illustrated in the flow diagram of FIG. 14A. The routine may incorporate the following arguments:

component: the strong component for which a plan is desired.

specifiedInputs?: If true, then the list of inputs is restricted to user-specified inputs. If false, then any independent variable may be an input to the plan if the variable is located upstream of an output variable.

worldSet: the world set for which the plan is sought.

plan: the plan structure that exists so far in the search.

Figure 15A:
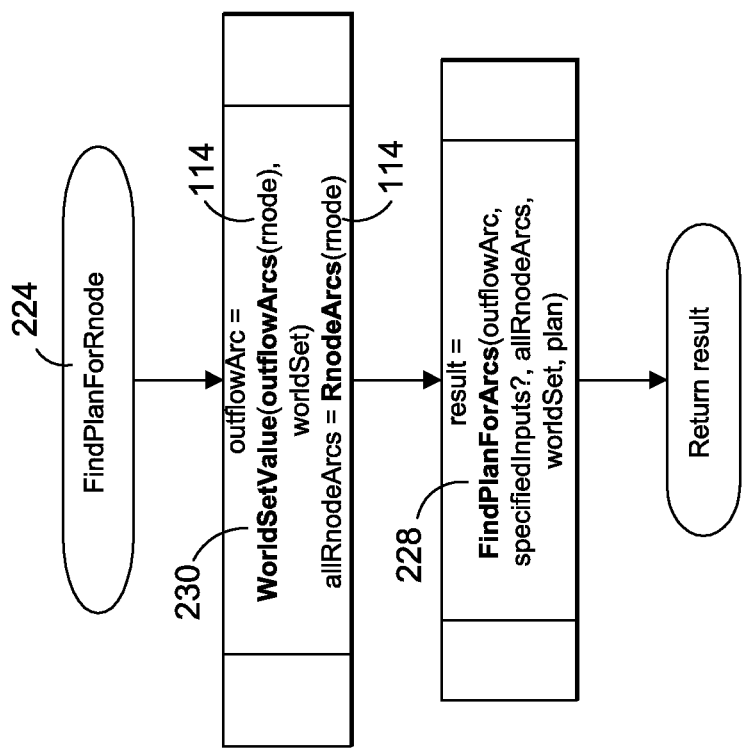
FIG. 15A is a flow diagram illustrating one or more operations that may be included in a method of determining a plan for a relation node in a world set.

Referring to FIGS. 15A-15B, shown in FIG. 15A is a flow diagram having one or more operations that may be included in the routine "FindPlanForRnode (mode, specifiedInputs?, worldSet, plan)". The routine 224 is configured to return True or False, depending upon whether one finds a plan for the mode 114 in the specified world set 140 or not. FIG. 15B is a pseudo-code listing of the routine "FindPlanForRnode" 224 illustrated in the flow diagram of FIG. 15A. The routine 224 may incorporate the following arguments:

mode: the equality constraint (i.e., the relation node) for which one is seeking a plan.

specifiedInputs?: If true, then the list of inputs is restricted to user-specified inputs. If false, then any independent variable may be an input to the plan if the variable is located upstream of an output variable.

worldSet: the world set for which one wants a plan for mode.

plan: the plan structure being modified by the routine and which contains the results of the search so far conducted.

Figure 16A:
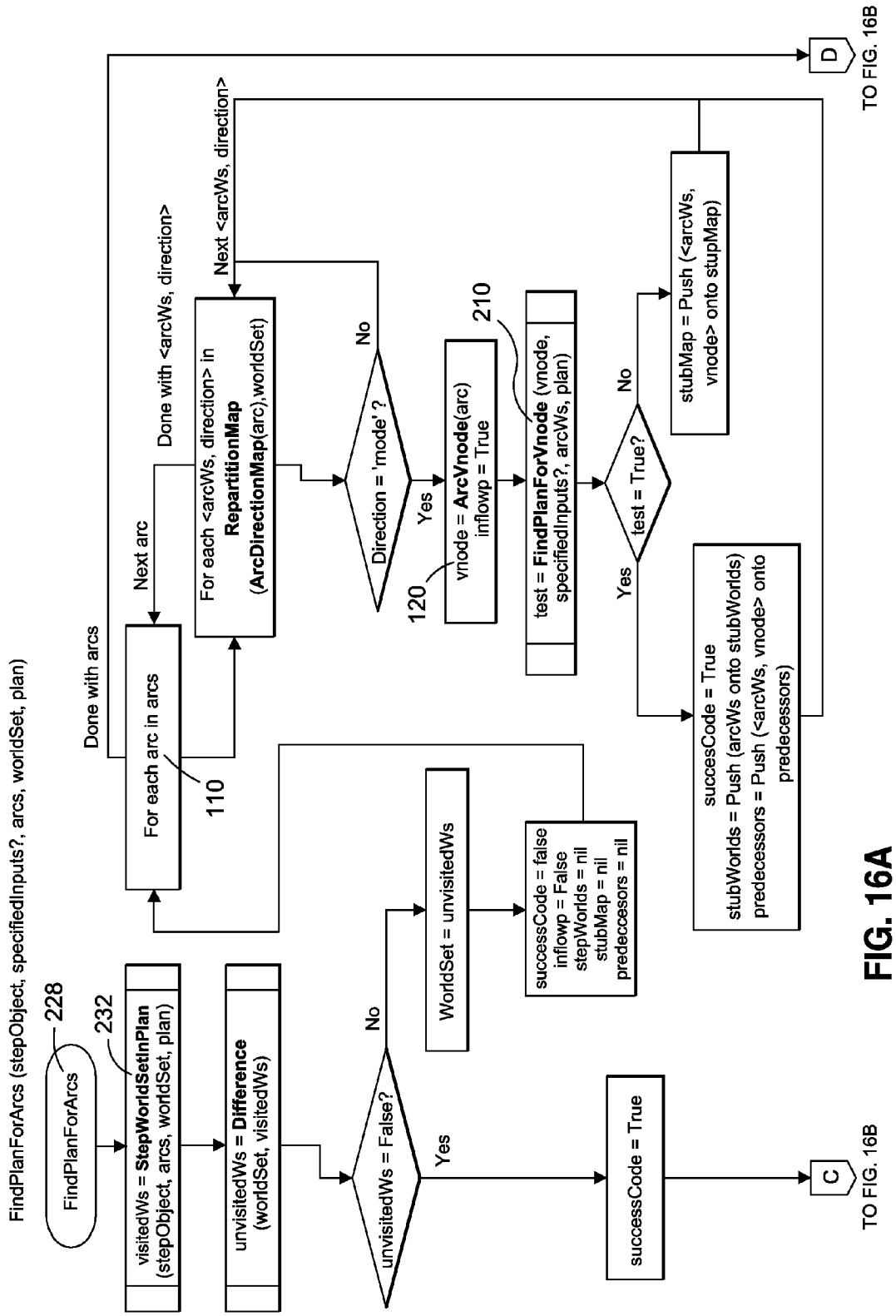
FIGS. 16A-16B represent a flow diagram illustrating one or more operations that may be included in a method of determining the plan for an input argument when a plan step comprises either an arc or a strong component.
Figure 16B:
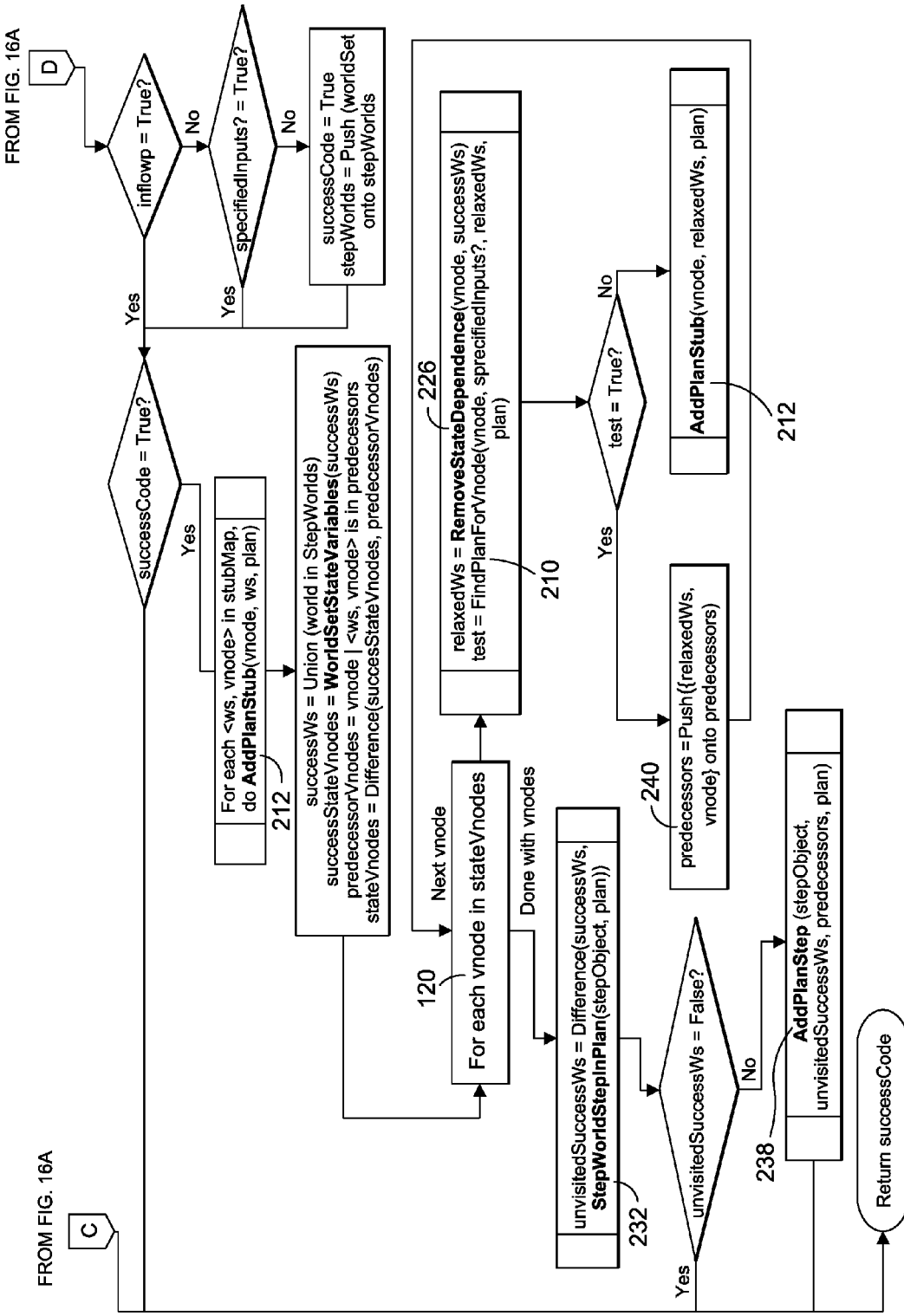

Referring to FIGS. 16A-16D, shown in FIGS. 16A-16B is a flow diagram having one or more operations that may be included in the routine "FindPlanForArcs 110 (stepObject, specifiedInputs?, arcs, worldSet, plan)". The routine 228 is configured to find a plan for the input argument, stepObject, where the step is either an arc 110 or a strong component 132. The routine 228 will return True or False depending upon whether the routine finds the plan. FIG. 16C-16D is a pseudo-code listing of the routine "FindPlanForArcs" 228 illustrated in the flow diagram of FIG. 16A-16B. The routine may incorporate the following arguments:

stepObject: the step for which one is seeking a plan and is either an arc or a strong component.

specifiedInputs?: If true, then the list of inputs is restricted to user-specified inputs. If false, then any independent variable may be an input to the plan 102 if the variable is located upstream of an output variable.

arcs: the set of arcs located upstream of the strong component or mode connected to the stepObject.

worldSet: the world set in which the plan is desired.

plan: The plan structure being modified by the routine and which contains the results of the search so far.

Figure 17A:
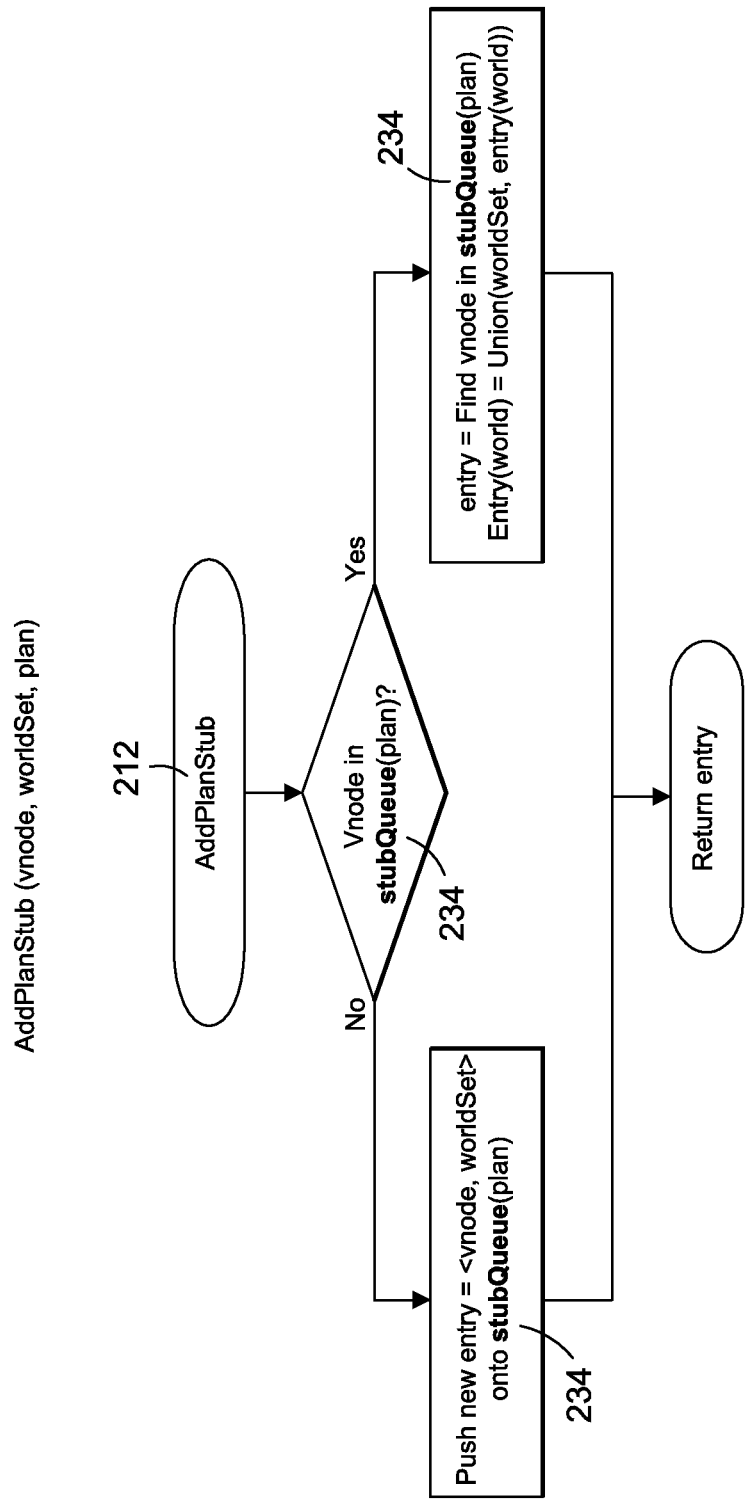
FIG. 17A is a flow diagram illustrating one or more operations that may be included in a method of modifying the plan structure by adding a variable and associated world set to the stub queue.

Referring to FIGS. 17A-17B, shown in FIG. 17A is a flow diagram having one or more operations that may be included in the routine "AddPlanStub (vnode, worldSet, plan)". The routine 212 is configured to return True or False, depending upon whether one finds a plan 102 for the mode 114 in the specified world set 140 or not. FIG. 17B is a pseudo-code listing of the routine "AddPlanStub" 212 illustrated in the flow diagram of FIG. 17A. The routine 212 modifies the plan structure by adding the variable node 120 (i.e., vnode) to the set of stubbed variables 122 of the plan 102 in the world set 140 (i.e., worldSet). The "AddPlanStub" 212 plan 102 maintains a queue of stub 130 entries wherein each entry is an association of a variable node 120 and a world set 140 in the sense that the variable node 120 is a stub 130 of the plan 102 in the associated world set 140. The routine 212 either modifies a pre-existing entry of the vnode 120 in the stub queue 234 of the plan 102 by forming the union of the associated world set 140 with that entry with the input 126 world set 140, worldSet, or the routine 212 adds a new entry for the pair <vnode, worldSet>.

Figure 18A:
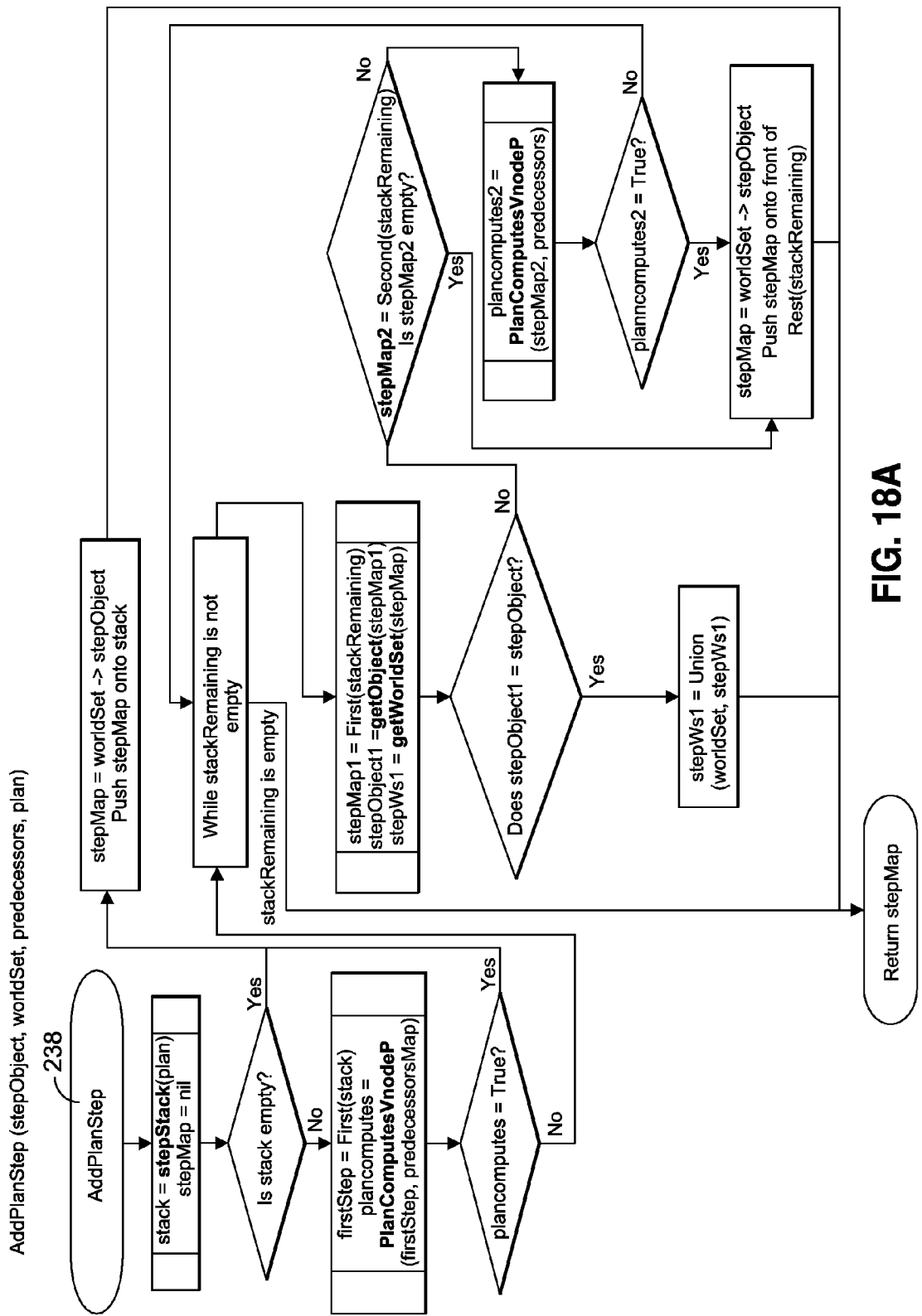
FIG. 18A is a flow diagram illustrating one or more operations that may be included in a method of modifying the plan structure by adding a computational step and associated world set to the plan queue.

Referring to FIGS. 18A-18B, shown in FIG. 18A is a flow diagram having one or more operations that may be included in the routine "AddPlanStep (stepObject, worldSet, predecessors, plan)". The routine 238 is configured to return True or False, depending upon whether one finds a plan for the mode 114 in the specified world set 140 or not. FIG. 18B is a pseudo-code listing of the routine "AddPlanStep" 238 illustrated in the flow diagram of FIG. 18A. The routine 238 maintains a stack, "stepStack(plan)" of maps, "world-set->step", where each step (i.e., an arc or a strong component) is to be executed when the plan is invoked if the associated world set 140 is true in the current data environment. During the backward chaining search of the constraint network, the stack is maintained in reverse order and is re-ordered at the end of the search process using the routine Finalize(plan) 214 as described below. The routine "AddPlanStep" 238 places the step object as early as possible in the stack but after all its predecessors 240. The routine 238 destructively modifies the plan step stack so that the step object is applicable in the given world set 140 and returns the new or modified entry. The routine 238 may incorporate the following arguments:

stepObject: either an arc or a strong component representing a step in the plan that potentially will be executed when the plan is invoked.

worldSet: the world set that must be true in the invoked plan's data environment for the associated step to be executed.

predecessors: the variable nodes that are located immediately upstream of the relation node and wherein each variable node is conditioned by a world set upon which the value of the object depends in that world set.

In the pseudo code of FIG. 18B, the function Rest(list) returns the same list structure, but starts at the second element in the list. The function First(list) returns the first element in the list. The function getObject(ws->object) returns the object in the map element ws->object. The function getWorldSet(ws->object) returns the world set in the map element.

Figure 19A:
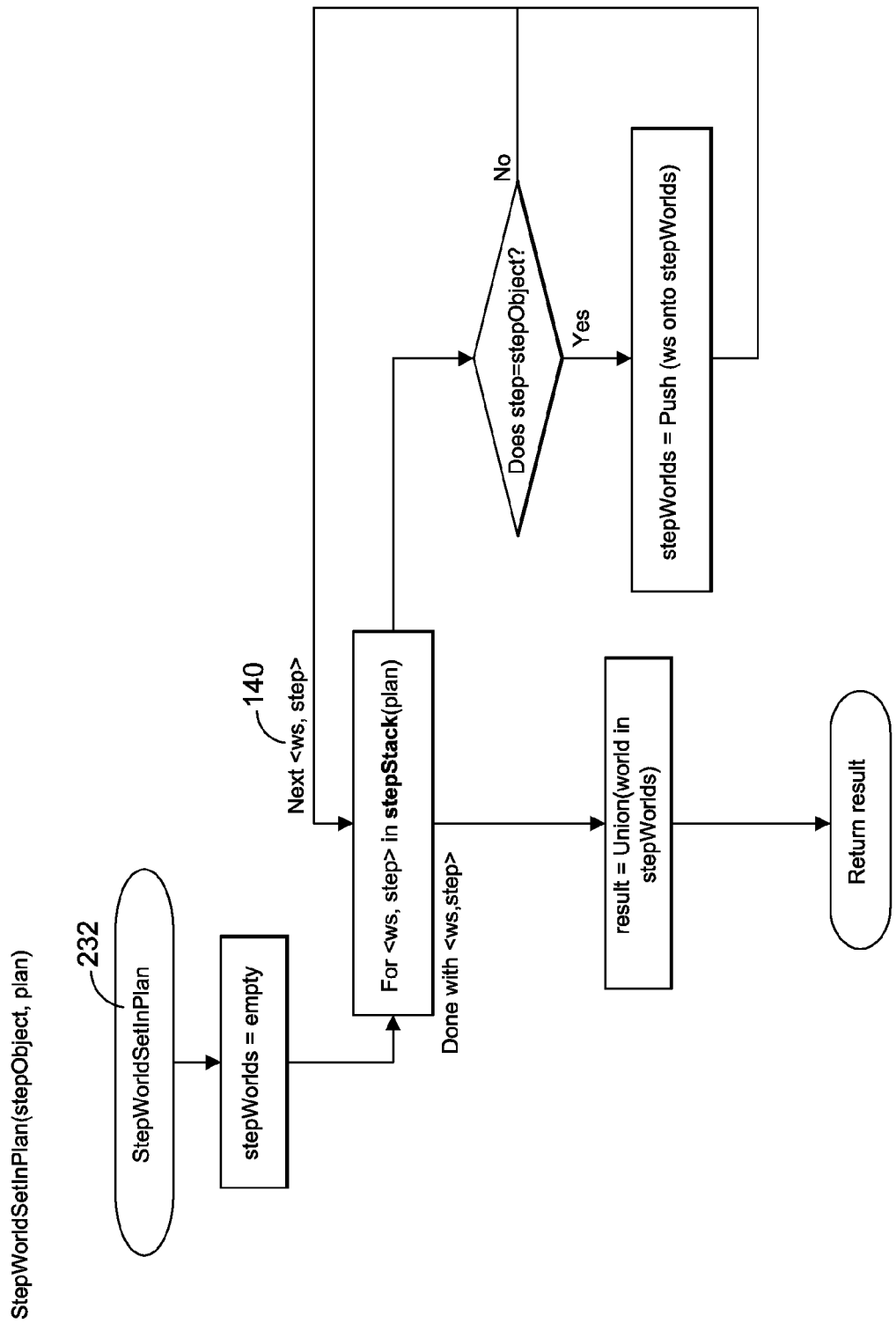
FIG. 19A is a flow diagram illustrating one or more operations that may be included in a method of determining a union of all of the world sets that are associated with an input step object of the plan.

Referring to FIGS. 19A-19B, shown in FIG. 19B is a flow diagram having one or more operations that may be included in the routine "StepWorldSetInPlan (stepObject, plan)". The "StepWorldSetInPlan" 232 routine is configured to return the union of all world sets 140 that are associated with the input 126 step object in the plan. FIG. 19B is a pseudo-code listing of the routine "StepWorldSetInPlan" 232 illustrated in the flow diagram of FIG. 19A. The routine 232 may incorporate the following arguments:

stepObject: the given object for which an associated world set is being requested.

plan: the plan having plan steps that are being investigated for a match to the given step object.

The system and method of determining a plan 102 for a constraint network 100 may also include a function "RemoveStateDependence(vnode, worldSet)" (not shown) for removing the dependence of worldSet on the state variable 124 vnode 120 as described above with regard to FIG. 8. Advantageously, the function "RemoveStateDependence" avoids infinite looping while also ensuring that the plan 102 includes steps to compute the values of state variables 124 when such state variables 124 are needed in the computational path. The function "RemoveStateDependence" may incorporate the following arguments:

vnode: the state variable for which one needs to remove dependence.

worldSet: the world set for which one need to remove possible dependence on the values of the state variable, vnode.

The "RemoveStateDependence" 226 function replaces literals and negations of literals involving the specified state variable in the well-formed-formula (WFF) representation of the world set with True, and then simplifies the result. For example, removing dependence on S in the WFF, "S=s1 And Q=q2" yields "True And Q=q2", which simplifies to "Q=q2". Removing dependence on S in the WFF, "S=s1 Or Q=q2", yields "True Or Q=q2", which simplifies to "True".

Implementation of the "RemoveStateDependence" 226 function is dependent on the data structure that is used to represent the world set 140. In one example, Lisp list structures (i.e., Allegro Common Lisp, commercially available from Franz, Inc., of Oakland, Calif.) may be used to represent the well formed formula that specifies the world set 140. In another example, multi-dimensional bit arrays (not shown) may be used to represent a world set wherein each dimension of the bit array may be associated with a given state variable and wherein the size of that dimension equals the number of specific values that the state variable could take.

In this regard, the WFFs associated with each computational step may be obtained by combinations of union, intersection, and/or difference operators to the WFFs associated with the equations that need to be solved. Such WFFs can become highly complex, depending upon which variables in the constraint network 100 are independent, and require rapid manipulation and combination of such propositional WFFs. The WFFs obtained through combinations of other WFFs require simplification for efficient computation during trade studies. In this regard, leaving combinations of WFFs in an un-simplified state may result in exploding memory size as the WFFs are further combined in relatively large networks involving thousands of equations. Furthermore, when a WFF simplifies to a universally false WFF, the computational plan generation procedure can prune unneeded branches of a constraint network 100 and thereby produce compact and efficient computational plans 102.

Such WFF simplification process may be extremely computationally intensive when applied to logic formulas having a large quantity of predicates over finite but large domains. Classical algorithms for determining the conjunctive normal forms of a WFF or the disjunctive normal forms of a WFF are inadequate to provide the system designer with computational results in a relatively short period of time (e.g., several minutes). The simplification of WFFs is preferably performed as rapidly as possible in order to reduce computational time and increase the amount of time available to a system designer to consider and investigate different design trades. A reduction in the amount of time for simplifying well-formed formulas may additionally provide a system designer with the capability to investigate larger and more complex design spaces.

For example, in the conceptual design of a hypersonic vehicle, a constraint management planning algorithm is required to simplify many WFFs containing numerous references to a large quantity of predicates during the planning of one of many desired trade studies. An example WFF may have only 10 to 15 predicates with each predicate having two to 20 possible values. Such WFFs may syntactically refer to the same predicates 5 to 10 times with a depth on a similar scale (e.g., And(Or(And Or(P1=–p11, P2=p21 . . . ) . . . Or(And(P1=p13, Or( Not(P1=p13) . . . )))) etc. Unfortunately, the simplification of such WFFs to a conjunctive normal form or a disjunctive normal form using classical algorithms requires 10 to 30 minutes of computer time in one implementation. The relatively long period of computer time for simplifying WFFs using classical algorithms directly detracts from the time available to a designer for considering and investigating larger and more complex design trades.

Advantageously, the simplification of well-formed formulas (WFFs) may support computational planning in a data-dependent constraint network as disclosed herein and illustrated in FIGS. 9A-20B. The process of simplifying WFFs may include converting an input WFF (not shown) into an initial bit array (not shown), simplifying the initial bit array into a simplified bit array (not shown) by removing predicates that are not necessary to represent the input WFF, and then converting the simplified bit array into a return WFF (not shown).

A bit array may be defined as an array having bit elements (not shown) that have a value of either "1" or "0". In addition, a bit array may include any number of dimensions. Each dimension can have a different size. For boolean predicates (not shown), the size of the corresponding bit array dimension is 2. For equality predicates (not shown), the size of the bit array dimension equals the length of the domain. A logic bit array may be defined as a bit array including a mapping of each dimension of the bit array to a list of the predicates (e.g., boolean and/or equality) included in the bit array.

An input WFF (not shown) may include atomic true or atomic false WFFs, atomic boolean predicate WFFs, atomic equality predicate WFFs, negation WFFs involving the negation operator (NOT), and compound WFFs involving the conjunction and disjunction operators AND or OR. The simplification of an input WFF may include determining the predicates in the input WFF, determining the domain elements associated with each one of the predicates, determining the bit array dimensions of the initial bit array, and recursively processing the input WFF by calling an internal program (not shown) and returning an initial bit array having the bit array dimensions, the predicates, and the domain elements associated with the input WFF.

For cases where the input WFF is an atomic WFF comprising a single boolean predicate, the single boolean predicate may be converted to an equality predicate. For cases where the input WFF is a compound WFF comprising zero or more of the atomic WFFs or a plurality of compound WFFs associated with either a disjunction operator (OR) or a conjunction operator (AND), or, exactly one atomic WFF or a compound WFF associated with a negation operator, each operand of the compound WFF may be recursively processed until atomic WFFs are encountered. The recursively processed WFFs may be combined according to whether the operator of the compound WFF is a negation operator (NOT), a conjunction operator (AND), or a disjunction operator (OR). An initial bit array is then returned for each one of the atomic WFFs.

For non-negated compound WFF cases where the operator is a conjunction operator (e.g., AND) or a disjunction operator (e.g., OR), the quantity of operands in the combined initial bit arrays may be determined. For a conjunction operator, the bit elements of the individual initial bit arrays may be combined in a manner such that the bit elements are equal to the conjunction (the "AND") of the individual initial bit arrays. For a disjunction operator, the bit elements of the individual initial bit arrays may be combined in a manner such that the bit elements are equal to the disjunction (the "OR") of the individual initial bit arrays. An initial bit array may include a plurality of bit array dimensions associated with the predicates.

An initial bit array may be simplified by removing predicates that are not necessary to represent the input WFF. In this regarding, the simplification of an initial bit array may generally comprise collapsing the initial bit array by removing semantically redundant bit array dimensions such as by comparing the bit elements of the sub-arrays for each one of the bit array dimensions to determine if a bit array dimension is collapsible. If the bit elements of the sub-arrays are equal, then the dimension associated with the sub-array can be removed.

A simplified bit array may be converted into a return WFF in disjunctive normal form (DNF) or in conjunctive normal form (CNF) by systematically processing the simplified bit array given a set of predicates and their respective domain elements, and constructing a return WFF. The conversion of a simplified bit array may comprise determining a total quantity of the bit elements in the simplified bit array having a value of 1, and converting the simplified bit array to a return WFF in disjunctive normal form (DNF) if less than one-half of the total quantity of the bit elements has a value of 1. The simplified bit array may be converted to a return WFF in conjunctive normal form (CNF) 142 if at least one-half of the total quantity of the bit elements has a value of 1.

Advantageously, the simplification of well-formed formulas in a data-dependent constraint management system or constraint network may result in a significant reduction in the amount of time required to simplify the results of the union, intersection, and difference operations of well-formed formulas which may significantly reduce the amount of time required for processing specific trade studies. The reduction in processing time provides the technical effect of allowing a designer to explore larger and more complex design spaces in an integrated manner using the computational planning method disclosed herein for data-dependent constraint networks 100.

Figure 20A:
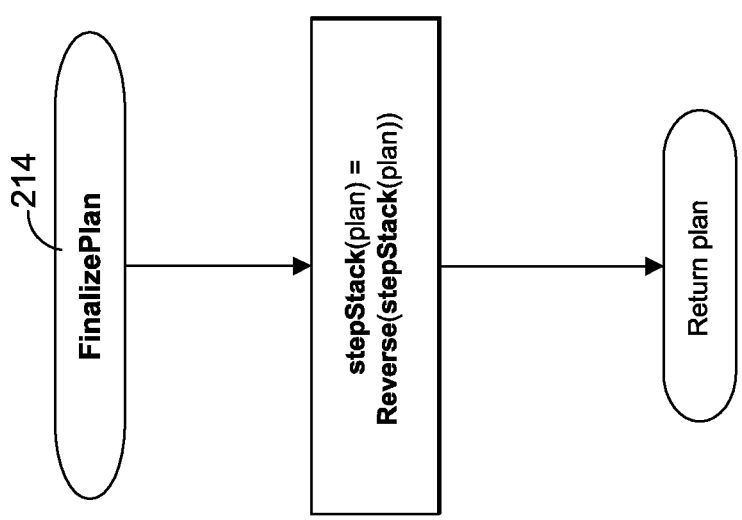
FIG. 20A is a flow diagram illustrating one or more operations that may be included in a method of finalizing the plan by reversing an order of plan steps of the plan.

Referring to FIGS. 20A-20B, shown in FIG. 20B is a flow diagram having one or more operations that may be included in the routine "Finalize(plan)". The routine 214 is configured to reverse the order for the plan steps that were pushed onto the plan step stack as described above. FIG. 20B illustrates a pseudo-code listing of the routine "Finalize" 204 illustrated in the flow diagram of FIG. 20A.

Figure 21:
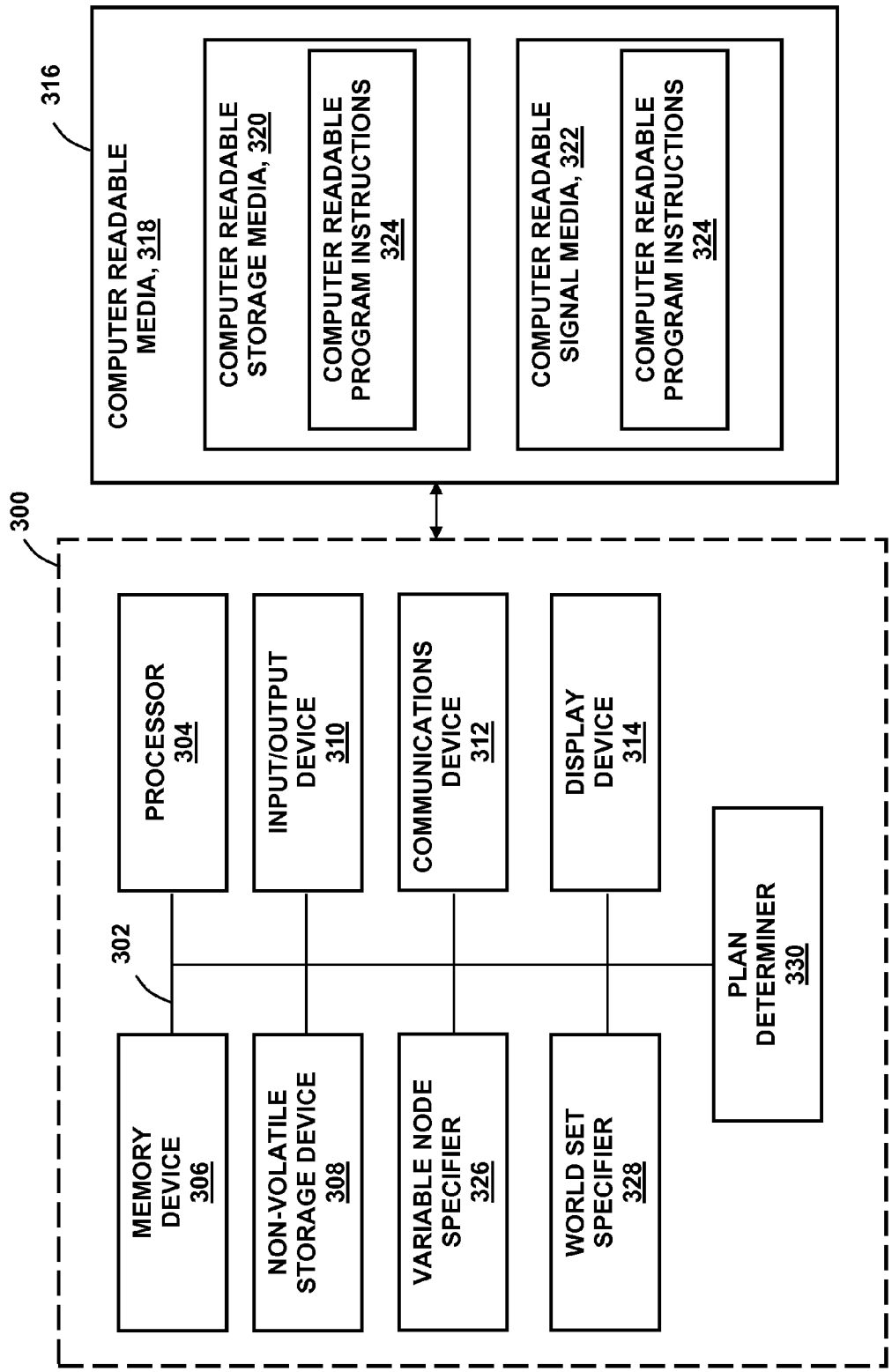
FIG. 21 is a block diagram of an embodiment of a processor-based system for implementing one or more operations of a method for determining a computational plan for a data-dependent constraint network.

Referring to FIG. 21, shown is a block diagram of a system for implementing the above-described computational planning method, in whole or in part, in a computer-implemented process such as on a processor-based system 300 or other suitable computer system. The processor-based system 300 may implement one or more of the above-described computational planning steps for a data-dependent constraint network 100 (FIG. 8). The processor-based system 300 may perform computer readable program instructions 324 which may be provided to or loaded onto the processor-based system 300 in order to implement one or more of the above-described operations or steps. In a non-limiting example, the processor-based system 300 and/or the computer readable program instructions 324 may facilitate the definition of the computational plan 102 for a data-dependent constraint network 100.

The block diagram of FIG. 21 illustrates the processor-based system 300 in an advantageous embodiment that may facilitate the determining of a computational plan 102 (FIG. 8) in a bipartite graph 106 (FIG. 8) representing the constraint network 100. The processor-based system 300 may determine a world set 140 (FIG. 7) in which a status of the variable nodes 120 (FIG. 8) is determined, and determine the computational plan 102 from one or more input 126 variable nodes 120 (FIG. 8) to one or more output 128 variable nodes 120 (FIG. 8) during a backward chaining search of the bipartite graph 106. In the embodiment illustrated in FIG. 21, the processor-based system 300 may include a data communication path 302 (e.g., data link) communicatively coupled to one or more component blocks to facilitate transfer of data between such component blocks. The communication path 302 may comprise one or more data buses or any other suitable communication path 302 that facilitates the transfer of data between the component blocks and devices of the processor-based system 300.

Referring to FIG. 21, in a non-limiting embodiment, the component blocks may include one or more of a processor 304, a memory device 306, a non-volatile storage device 308, a communications device 312, an input/output device 310, and a display device 314. The system may further include a variable node specifier 326, a world set specifier 328, and a plan determiner 330. As indicated above, the variable node specifier 326 may be configured to facilitate the specifying of one or more variable nodes 120 as inputs 126 representing a starting point for the plan 102, and one or more variable nodes 120 as outputs 128 to be computed by the plan 102. The world set specifier 328 may be configured to facilitate the specifying of a world set 140 in which the computational plan 102 is desired. If inputs 126 (e.g., input variable nodes 120) are not specified, the plan determiner 330 may be configured to determine the plan 102 from all of the inputs 126 in the constraint network 100 influencing a value of the outputs 128. If a world set 140 is not specified, the plan determiner 330 may be configured to determine a world set 140 in which a status of the variable nodes 120 is in a determined state.

The plan determiner 330 may be configured to determine the plan 102 from the input(s) 126 to the output(s) 128 during a search of the bipartite graph 106. Upon determining the plan 102, the plan determiner 330 may be configured to provide the plan as an input list 220 or queue, an output list 218 or queue, a stub queue 234, and a plan queue 236 as described above. If the input variables 126 are specified as arguments, the plan determiner 330 may be configured to update the world set 140 associated with a specified input variable 126 by unioning the evolving world set derived on a search path with the world set 140 associated with that input variable. During the backward chaining search of the bipartite graph, the plan determiner 330 may be configured to start with an output 128 variable node 120 and update the output list 218 by adding the output 128 variable node 120 and a specified world set 140 to the output list 218 if the output 128 variable node 120 is in a determined state for the entirety of the specified world set 140.

During the backward chaining search, the plan determiner 330 may additionally be configured to update the plan 102 while following each one of the incoming arcs 110 backwards along a search path by recursively performing the following operations for a given world set: finding the plan for a variable node 120, finding the plan for a component 132, finding the plan for a relation node, and finding the plan for an arc, the world sets 140 that enable the incoming arcs 110 associated with a given variable node 120 being disjoint. In addition, the plan determiner 330 may be configured to maintain, while updating the plan 102, an appropriate world set 140 along the search path as an intersection of an evolving world set 140 with enabling world sets 140 of additional elements in the search path, wherein the additional elements comprise variable nodes 120, components 132, relation nodes 114, and arcs 110. Furthermore, the plan determiner 330 may be configured to find, for each incoming arc 110, a plan for a component 132 if the incoming arc 110 is part of a component 132 or, a plan for a relation node 114 if the incoming arc 110 is not part of a component 132.

In FIG. 21, the plan determiner 330 may additionally be configured to find a plan for all arcs 110 of component 132 predecessors, find a plan for all incoming arcs 110 of the relation nodes 114, and remove a dependence of the world set 140 on a state variable 124, wherein the state variable 124 may comprise a boolean variable or, a categorical variable having discrete values over a finite domain. During the backward chaining search, the plan determiner 330 may be configured to update the plan queue 236 by adding the arcs 110 or components 132 and associated world sets 140 in a reverse order of the search path upon reaching a specified input variable node 120, or upon reaching an independent input variable node 120 if a specified input variable node 120 is not provided. Furthermore, the plan determiner 330 may be configured to initially note or determine whether any search path starting with a predecessor arc 110 of a plan step ends at a specified input 126 variable node 120 and, if so, update the stub queue 234 with a stub variable and an associated stub world set 140. The stub variable comprises the variable associated with any other predecessor arc 110 whose search paths do not terminate at any of the specified input 126 variables. The stub world set comprises the union of the world sets 140 of those search paths. Upon determining the plan 102, the plan determiner 330 may be configured to finalize the plan 102 by reversing an order of plan steps.

Referring still to FIG. 21, the results of any one of the above-described steps of specifying inputs 126 and outputs 128 for the computational plan 102, specifying a world set 140 in which a status of the variable nodes 120 is determined, and performing the backward chaining search of the bipartite graph 106, may be transmitted to the input/output device 310. The input/output device 310 may be communicatively coupled to the display device 314 which may be configured to display the results of the computational planning. The display device 314 may be configured to display the progress and/or results of an implementation of the computational planning. In addition, the display device 314 may be configured to display the results of a trade study implemented in a data-dependent constraint management system (FIG. 8) using the computational planning process.

In an embodiment, the processor-based system 300 may include one or more of the processors 304 for executing instructions of computer readable program instructions 324 that may be installed into the memory device 306. Alternatively, the processor 304 may comprise a multi-processor core having two or more integrated processors cores. Even further, the processor 304 may comprise a main processor and one or more secondary processors integrated on a chip. The processor 304 may also comprise a many-processor system having a plurality of similarly configured processors.

Referring still to FIG. 21, the processor-based system 300 may further include one or more memory devices 306 which may comprise one or more of volatile or non-volatile storage devices 308. However, the memory device 306 may comprise any hardware device, without limitation. For example, the memory device 306 may comprise a random access memory or a cache of an interface and/or integrated memory controller hub which may be included in the communication path. The memory device 306 may be configured to permanently and/or temporarily store any one of a variety of different types of data, computer readable code or program instructions, or any other type of information. The non-volatile storage device 308 may be provided in a variety of configurations including, but not limited to, a flash memory device, a hard drive, an optical disk, a hard disk, a magnetic tape or any other suitable embodiment for long-term storage. In addition, the non-volatile storage device 308 may comprise a removable device such as a removable hard drive.

The processor-based system 300 may additionally include one or more of the input/output devices 310 to facilitate the transfer of data between components 132 that may be connected to the processor-based system 300. The input/output device 310 may be directly and/or indirectly coupled to the processor-based system 300. The input/output device 310 may facilitate user-input by means of a peripheral device such as a keyboard, a mouse, a joystick, a touch screen and any other suitable device for inputting data to the processor-based system 300. The input/output device 310 may further include an output device for transferring data representative of the output of the processor-based system 300. For example the input/output device 310 may comprise a display device 314 such as a computer monitor or computer screen for displaying results of data processed by the processor-based system 300. The input/output device 310 may optionally include a printer or fax machine for printing a hardcopy of information processed by the processor-based system 300.

Referring still to FIG. 21, the processor-based system 300 may include one or more communications devices 312 to facilitate communication of the processor-based system 300 within a computer network and/or with other processor-based systems. Communication of the processor-based system 300 with a computer network or with other processor-based systems may be by wireless means and/or by hardwire connection. For example, the communications device 312 may comprise a network interface controller to enable wireless or cable communication between the processor-based system 300 and a computer network. The communications device 312 may also comprise a modem and/or a network adapter or any one of a variety of alternative device for transmitting and receiving data.

One or more of the operations of the methodology described above for computational planning in a data-dependent constraint network 100 may be performed by the processor 304 and/or by one or more of the variable node specifier 326, the world set specifier 328, and the plan determiner 330 using the computer readable program instructions 324. The computer readable program instructions 324 may comprise program code which may include computer usable program code and computer readable program code. The computer readable program instructions 324 may be read and executed by the processor 304. The computer readable program instructions 324 may enable the processor 304 to perform one or more operations of the above-described embodiments associated with computational planning in a constraint network 100.

Referring still to FIG. 21, the computer readable program instructions 324 may include operating instructions for the processor-based system 300 and may further include applications and programs. The computer readable program instructions 324 may be contained and/or loaded onto one or more of memory devices 306 and/or non-volatile storage devices 308 for execution by the formula processor 304, the formula converter, the bit array simplifier, the bit array converter, and/or the bit array constructor. As indicated above, one or more of the memory devices 306 and/or non-volatile storage devices 308 may be communicatively coupled to one or more of the remaining component blocks illustrated in FIG. 21 through the communication path.

The computer readable program instructions 324 may be contained on tangible or non-tangible, transitory or non-transitory computer readable media 318 and which may be loaded onto or transferred to the processor-based system 300 for execution by the processor. The computer readable program instructions 324 and the computer readable media 318 comprise a computer program product 316. In an embodiment, the computer readable media 318 may comprise computer readable storage media 320 and/or computer readable signal media 322.

The computer readable storage media 320 may comprise a variety of different embodiments including, but not limited to, optical disks and magnetic disks that may be loaded into a drive, a flash memory device or other storage device or hardware for transfer of data onto a storage device such as a hard drive. The computer readable storage media 320 may be non-removably installed on the processor-based system 300. The computer readable storage media 320 may comprise any suitable storage media and may include, without limitation, a semiconductor system or a propagation medium. In this regard, the computer readable storage media 320 may comprise electronic media, magnetic media, optical media, electromagnetic media, and infrared media. For example, the computer readable storage media 320 may comprise magnetic tape, a computer diskette, random access memory and read-only memory. Non-limiting examples of embodiments of optical disks may include compact disks-read only memory, compact disks-read/write, and digital video disks.

The computer readable signal media 322 may contain the computer readable program instructions 324 and may be embodied in a variety of data signal configurations including, but not limited to, an electromagnetic signal and an optical signal. Such data signals may be transmitted by any suitable communications link including by wireless or hardwire means. For example, the hardwire means may comprise an optical fiber cable, a coaxial cable, a signal wire and any other suitable means for transmitting the data by wireless or by physical means.

Referring still to FIG. 21, the computer readable signal media 322 may facilitate the downloading of the computer readable program instructions 324 to the non-volatile storage or other suitable storage or memory device 306 for use within processor-based system 300. For example, the computer readable program instructions 324 contained within the computer readable storage media 320 may be downloaded to the processor-based system 300 over a computer network from a server or client computer of another system.

Any one of a variety of different embodiments of the processor-based system 300 may be implemented using any hardware device or system capable of executing the computer readable program instructions 324. For example, the processor 304 may comprise a hardware unit configured for performing one or more particular functions wherein the computer readable program instructions 324 for performing the functions may be pre-loaded into the memory device 306.

In an embodiment, the processor 304 may comprise an application specific integrated circuit (ASIC), a programmable logic device, or any other hardware device configured to perform one or more specific functions or operations. For example, a programmable logic device may be temporarily or permanently programmed to perform one or more of the operations related to the computational planning in a constraint network 100. The programmable logic device may comprise a programmable logic array, programmable array logic, a field programmable logic array, and a field programmable gate array and any other suitable logic device, without limitation. In an embodiment, the computer readable program instructions 324 may be operated by the one or more processors and/or by other devices including one or more hardware units in communication with the processor 304. Certain portions of the computer readable program instructions 324 may be run be the processor 304 and other portions of the computer readable program instructions 324 may be run by the hardware units.

Advantageously, the system and method disclosed herein for creating a conditional computational plan 102 for a data-dependent constraint network 100 avoids the intermixing of planning and computation as is required by traditional conditional planning algorithms. In this regard, the computational planning system and method disclosed herein provide the technical effect of facilitating the performance of trade studies over a significantly broader range of trade spaces during front-end trade studies or during conceptual design of complex engineering systems relative to a limited range of trade spaces provided by traditional conditional planning methods. A further technical effect provided by the computational planning method disclosed herein is a significant increase in the efficiency with which trade studies may be conducted across a heterogeneous trade space wherein a system configuration or vehicle configuration (e.g., a configuration of an air vehicle or a launch vehicle) may change significantly across the trade space and, therefore, the equations describing vehicle cost, vehicle performance, and other parameters, may have significantly different parametric forms. In addition to significantly increasing the rapidity with which a designer may explore a broad range of trade spaces, the computational planning system and method disclosed herein provides the technical effect of facilitating a significant increase in the completeness with which a given trade space may be explored within a given time period.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A processor-based method of determining a conditional computational plan for a data dependent constraint network for use in modeling an engineering system, the data dependent constraint network represented by a bipartite graph containing a plurality of variable nodes, and relation nodes, the variable nodes and the relation nodes being interconnected by arcs, the variable nodes representing variables in the data dependent constraint network, the relation nodes defining constraints between possible values of the variable nodes, and conditions on relation nodes defining applicability of different constraints during at least one of design analysis and design optimization of the engineering system, the method comprising the steps of:

specifying, using a variable node specifier on a computer, a set of input variable nodes and one or more output variable nodes of the plurality of variable nodes for which a conditional computational plan is desired, wherein the conditional computational plan is a partially-ordered sequence of computational plan steps, each plan step is associated with a condition under which that plan step is executed during an execution phase of the conditional computational plan, the condition on a plan step is defined by a world set, the condition evaluates to a truth value during plan execution, the truth value of the condition is dependent on data computed in previous plan steps and is either true or false, the plan steps are processed during plan execution in an order that the plan steps are stored in the conditional computational plan, a plan step is executed during plan execution if and only if the condition associated with the plan step evaluates to a truth value of true;

determining, using a plan determiner on the computer, the conditional computational plan from the input variable nodes to the one or more output variable nodes using a backward chaining search of the bipartite graph, wherein the plan determiner maintains an evolving world set condition for each search path during the backward chaining search, the plan determiner further associates each plan step with a world set condition under which that plan step is executed during plan execution, the plan determiner further includes in the plan step a minimal set of variables whose values are needed during plan execution, the plan determiner further ensures that only relevant non-superfluous variables are chosen as iteration variables in plan steps requiring iterative solution; and using the conditional computational plan to evaluate candidate design concepts to determine an optimal design of at least one of a system configuration and a vehicle configuration of an engineering system during at least one of design analysis and design optimization of the engineering system, wherein evaluation of the candidate design concepts includes executing a series of computations specified in the conditional computational plan that calculate values of the one or more output variable nodes from values of the input variable nodes using the minimal set of variable values required at each plan step, and selecting only relevant, non-superfluous variables as iteration variables in plan steps requiring iterative solution, thereby improving efficiency of at least one of design analysis and design optimization of the engineering system.

2. The method of claim 1, further comprising the step of:
specifying the input variable nodes from which computational steps of the conditional computational plan are desired for computing values of the one or more output variable nodes.

3. The method of claim 2, wherein if input variable nodes are not specified, further comprises the step of:
determining the conditional computational plan from all of the input variable nodes in the constraint network influencing values of the one or more output variable nodes.

4. The method of claim 1, further comprising the step of:
specifying, using a world set specifier, a world set in which the conditional computational plan is desired.

5. The method of claim 4, wherein if the world set is not specified, further comprising:
determining the world set in which each output variable node is in a determined state.

6. The method of claim 1, wherein the step of determining the conditional computational plan includes:
providing an input list, an output list, a stub queue, and a plan queue;
the input list comprising an association between an input variable and an input variable world set, an input variable world set being a maximal world set in which the input variable is independent and wherein one or more output variables are dependent on that input variable in that world set;
the output list having elements comprising an association between an output variable node and the maximal world set in which the output variable node is determined;
the plan queue comprising a list of plan steps having elements comprising an association between a plan step and the world set in which the plan step is to be executed;
a plan step comprising one of the following:
an arc associated with a computational method to compute a value of a single one of the variable nodes; and
a component associated with a computational method to simultaneously compute the value of a plurality of the variable nodes in the component; and
the stub queue having elements comprising an association between a stub variable node and a world set, wherein a stub variable is any variable that is needed in one or more plan steps but is independent of any specified input variables, and the world set associated with that stub variable is the world set in which the stub variable is needed to evaluate the one or more plan steps.

7. The method of claim 6, wherein if the input variables nodes are specified as arguments, the method further includes the steps of:
updating the input list by updating the world set associated with a specified input variable by unioning the evolving world set derived on a search path with the world set associated with that input variable.

8. The method of claim 6, wherein the step of determining the conditional computational plan using the backward chaining search of the bipartite graph includes:
starting with the output variable node, the output variable node having a specified world set and one or more incoming arcs; and
updating the output list by adding the output variable node and the specified world set to the output list if the output variable node is in a determined state for the entirety of the specified world set.

9. The method of claim 8, wherein the step of determining the conditional computational plan using the backward chaining search of the bipartite graph includes:
updating the conditional computational plan while following each one of the incoming arcs backwards along a search path by recursively performing, for a given world set, the following operations: finding the plan for a variable node, finding the conditional computational plan for a component, finding the conditional computational plan for a relation node, and finding the conditional computational plan for an arc, wherein world sets that enable the incoming arcs associated with a given variable node are disjoint;
maintaining, while updating the conditional computational plan, an appropriate world set along the search path as an intersection of an evolving world set with enabling world sets of additional elements in the search path, the additional elements comprising variable nodes, components, relation nodes, and arcs; and
finding, for each incoming arc, a conditional computational plan for a component if the incoming arc is part of a component, or, a conditional computational plan for a relation node if the incoming arc is not part of a component.

10. The method of claim 9, wherein the step of finding, for each incoming arc, a conditional computational plan for a component or, a conditional computational plan for a relation node includes:
finding a conditional computational plan for all arcs of component predecessors;
finding a conditional computational plan for all incoming arcs of the relation nodes; and
removing a dependence of the world set on a state variable, the state variable comprising at least one of the following: a boolean variable, a categorical variable having discrete values over a finite domain.

11. The method of claim 6, wherein the step of determining the conditional computational plan using the backward chaining search of the bipartite graph includes:
updating a plan queue by adding the arcs or components and associated world sets in a reverse order of a search path upon reaching a specified input variable node, or upon reaching an independent input variable node if a specified input variable node is not provided.

12. The method of claim 6, wherein the step of determining the conditional computational plan using the backward chaining search of the bipartite graph includes:
updating the stub queue for the conditional computational plan with the plan step stub variables and their corresponding stub world sets in the case that at least one predecessor of the plan step ends in a specified input variable;
each stub variable of a plan step being the variable of a predecessor arc of the plan step, for which none of the search paths from that predecessor arc ends in a specified input node; and
the corresponding stub world being the arc world set associated with that predecessor arc.

13. The method of claim 1, further comprising the step of:
finalizing the conditional computational plan by reversing an order of plan steps.

14. A method of determining a conditional computational plan for a data dependent constraint network for use in modeling an engineering system, the dependent constraint network represented by a bipartite graph containing a plurality of variable nodes, and relation nodes, the variable nodes and the relation nodes being interconnected by arcs, the variable nodes representing variables in the data dependent constraint network, the relation nodes defining constraints between possible values of the variable nodes, and conditions on relation nodes defining relevance and validity of different constraints during at least one of design analysis and design optimization of the engineering system, the method comprising the steps of:

specifying, using a variable node specifier on a computer, a set of input variable nodes and one or more output variable nodes of the plurality of variable nodes for which conditional computational plans are desired, wherein a conditional computational plan is a partially-ordered sequence of computational plan steps, each plan step is associated with a condition under which that plan step is executed during an execution phase of the conditional computational plan, the condition on a plan step is defined by a world set, the condition evaluates to a truth value during plan execution, the truth value of the condition is dependent on data computed in previous plan steps and is either true or false, the plan steps are processed during plan execution in an order that the plan steps are stored in the conditional computational plan, a plan step is executed during plan execution if and only if the condition associated with the plan step evaluates to a truth value of true;

specifying, on the variable node specifier on the computer, the input variable nodes from which computational plan steps of the conditional computational plans are desired for computing values of the one or more output variable nodes;

specifying world sets in which the conditional computational plans are desired;

1determining, using a plan determiner on the computer, the conditional computational plans from the input variable nodes to the one or more output variable nodes using a backward chaining search of the bipartite graph, wherein the plan determiner maintains an evolving world set condition for each search path during the backward chaining search, the plan determiner further associates while associating each plan step with a world set condition under which that plan step is executed during plan execution, the plan determiner further includes in the plan step a minimal set of variables whose values are needed during plan execution, the plan determiner further ensures that only relevant non-superfluous variables are chosen as iteration variables in plan steps requiring iterative solution; and using the conditional computational to evaluate candidate design concepts to determine an optimal design of at least one of a system configuration and a vehicle configuration of an engineering system during at least one of design analysis and design optimization of the engineering system, wherein evaluation of the candidate design concepts includes executing a series of computations specified in the conditional computational plan that calculate values of the one or more output variable nodes from values of the input variable nodes using the minimal set of variable values required at each plan step, and selecting only relevant, non-superfluous variables as iteration variables in plan steps requiring iterative solution, thereby improving efficiency of at least one of design analysis and design optimization of the engineering system.

15. A processor-based system for determining a conditional computational plan for a data dependent constraint network for use in modeling an engineering system, the dependent constraint network represented by a bipartite graph containing a plurality of variable nodes, and relation nodes, the variable nodes and the relations nodes being interconnected by arcs, the variable nodes representing attributes of the engineering system, the relation nodes defining constraints between possible values of the variables nodes, and conditions on relation nodes defining relevance and validity of different constraints during at least one of design analysis and design optimization of the engineering system, the processor-based system comprising:

a processor;

a memory communicatively coupled to the processor and storing instructions that, when executed by the processor, cause the processor-based system to perform as:

a variable node specifier configured to specify a set of input variable nodes and one or more output variable nodes of the plurality of variable nodes for which a conditional plan is desired, the set of input variable nodes being inputs representing a starting point for the conditional computational plan, the one or more output variable nodes being outputs to be computed by the conditional computational plan;

a plan determiner configured to determine the conditional computational plan from the input variable nodes to the one or more output variable nodes using a backward chaining search of the bipartite graph, wherein the plan determiner maintains an evolving world set condition for each search path during the backward chaining search, the plan determiner further associates each plan step with a world set condition under which that plan step is executed during plan execution, the plan determiner further includes in the plan step a minimal set of variables whose values are needed during plan execution, the plan determiner further ensures that only relevant, non-superfluous variables are chosen as iteration variables in plan steps requiring iterative solution;

wherein a conditional computational plan is a partially-ordered sequence of computational plan steps, each plan step is associated with a condition under which that plan step is executed during an execution phase of the conditional computational plan, the condition on a plan step is defined by a world set, the condition evaluates to a truth value during plan execution, the truth value of the condition is dependent on data computed in previous plan steps and is either true or false, the plan steps are processed during plan execution in an order that the plan steps are stored in the conditional computational plan, a plan step is executed during plan execution if and only if the condition associated with the plan step evaluates to a truth value of true; and the conditional computational plan evaluating candidate design concepts to determine an optimal design of at least one of a system configuration and a vehicle configuration of an engineering system during at least one of design analysis and design optimization of the engineering system, wherein evaluation of the candidate design concepts includes executing a series of computations specified in the conditional computational plan that calculate values of the one or more output variable nodes from values of the input variable nodes using the minimal set of variable values required at each plan step, and selecting only relevant non-superfluous variables as iteration variables in plan steps requiring iterative solution, thereby improving efficiency of at least one of design analysis and design optimization of the engineering system.

16. The system of claim 15, wherein: the plan determiner, if input variable nodes are not specified, is configured to determine the conditional computational plan from all of the input variable nodes in the constraint network influencing values of the one or more output variable nodes.

17. The system of claim 15, further comprising:
a world set specifier configured to specify a world set in which the conditional computational plan is desired.

18. The system of claim 17, wherein:
the plan determiner, if a world set is not specified, is configured to determine the world set in which each output variable node is in a determined state.

19. The system of claim 15, wherein:
the plan determiner, upon determining the conditional computational plan, is configured to provide an input list, an output list, a stub queue, and a plan queue;
the input list comprising an association between an input variable and an input variable world set, an input variable world set being a maximal world set in which the input variable is independent and wherein one or more output variables are dependent on that input variable in that world set;
the; output list having elements comprising an association between an output variable node and the maximal world set in which the output variable node is determined.
the plan queue comprising a list of plan steps having elements comprising an association between a plan step and the world set in which the plan step is to be executed;
a plan step comprising one of the following:
an arc associated with a computational method to compute a value of a single one of the variable nodes; and
a component associated with a computational method to simultaneously compute the value of a plurality of the variable nodes in the component; and
the stub queue having elements comprising an association between a stub variable node and a world set, wherein a stub variable is any variable that is needed in one or more plan steps but is independent of any specified input variables, and the world set associated with that stub variable is the world set in which the stub variable is needed to evaluate the one or more plan steps.

20. The system of claim 19, wherein:
the plan determiner, if the input variables nodes are specified as arguments, is configured to update the world set associated with a specified input variable by unioning the evolving world set derived on a search path with the world set associated with that input variable.

21. The system of claim 19, wherein:
the plan determiner, during the backward chaining search of the bipartite graph, is configured to start with the output variable node, the output variable node having a specified world set and one or more incoming arcs; and
the plan determiner being configured to update the output list by adding the output variable node and the specified world set to the output list if the output variable node is in a determined state for the entirety of the specified world set.

22. The system of claim 21, wherein:
the plan determiner, during the backward chaining search, is configured to update the conditional computational plan while following each one of the incoming arcs backwards along a search path by recursively performing, for a given world set, a set of operations as follows: finding the conditional computational plan for a variable node, finding the conditional computational plan for a component, finding the conditional computational plan for a relation node, and finding the conditional computational plan for an arc, wherein world sets that enable the incoming arcs associated with a given variable node being disjoint;
the plan determiner being configured to maintain, while updating the conditional computational plan, an appropriate world set along the search path as an intersection of an evolving world set with enabling world sets of additional elements in the search path, the additional elements comprising variable nodes, components, relation nodes, and arcs; and
the plan determiner being configured to find, for each incoming arc, a conditional computational plan for a component if the incoming arc is part of a component or, a conditional computational plan for a relation node if the incoming arc is not part of a component.

23. The system of claim 22, wherein:
the plan determiner is configured to find a conditional computational plan for all arcs of component predecessors, find a conditional computational plan for all incoming arcs of the relation nodes, and remove a dependence of the world set on a state variable; and
the state variable comprising at least one of the following: a boolean variable, a categorical variable having discrete values over a finite domain.

24. The system of claim 19, wherein:
the plan determiner, during the backward chaining search, is configured to update a plan queue by adding the arcs or components and associated world sets in a reverse order of a search path upon reaching a specified input variable node, or upon reaching an independent input variable node if a specified input variable node is not provided.

25. The system of claim 19, wherein:
the plan determiner, during the backward chaining search, is configured to update the stub queue for the conditional computational plan with the plan step stub variables and their corresponding stub world sets in the case that at least one predecessor of the plan step ends in a specified input variable;
each stub variable of a plan step being the variable of a predecessor arc of the plan step, for which none of the search paths from that predecessor arc ends in a specified input node; and
the corresponding stub world being the arc world set associated with that predecessor arc.

26. The system of claim 15, wherein:
the plan determiner is configured to finalize the conditional computational plan by reversing an order of plan steps.

* * * * *